US012411342B2

(12) United States Patent
Rabner

(10) Patent No.: US 12,411,342 B2
(45) Date of Patent: Sep. 9, 2025

(54) HEAD MOUNTED DISPLAY (HMD) APPARATUS, METHOD, AND SYSTEM

(71) Applicant: HYPERVISION LTD, Yokneam Illit (IL)

(72) Inventor: Arthur Rabner, Yokneam Illit (IL)

(73) Assignee: HYPERVISION LTD, Yokneam Illit (IL)

( * ) Notice: Subject to any disclaimer, the term of this patent is extended or adjusted under 35 U.S.C. 154(b) by 485 days.

(21) Appl. No.: 17/910,257

(22) PCT Filed: Mar. 10, 2021

(86) PCT No.: PCT/IB2021/051996
§ 371 (c)(1),
(2) Date: Sep. 8, 2022

(87) PCT Pub. No.: WO2021/181303
PCT Pub. Date: Sep. 16, 2021

(65) Prior Publication Data
US 2023/0106173 A1    Apr. 6, 2023

Related U.S. Application Data

(60) Provisional application No. 62/988,148, filed on Mar. 11, 2020.

(51) Int. Cl.
*G02B 27/01*    (2006.01)

(52) U.S. Cl.
CPC .. *G02B 27/0172* (2013.01); *G02B 2027/0123* (2013.01); *G02B 2027/0185* (2013.01); *G02B 2027/0187* (2013.01)

(58) Field of Classification Search
CPC ........ G02B 27/0172; G02B 2027/0123; G02B 2027/0185; G02B 2027/018
See application file for complete search history.

(56) References Cited

U.S. PATENT DOCUMENTS 5,334,991 A    8/1994 Wells et al.
6,529,331 B2    3/2003 Massof et al.
(Continued)

FOREIGN PATENT DOCUMENTS

CN    107370937    11/2017
CN    108959875    12/2018
(Continued)

OTHER PUBLICATIONS

International Search Report and the Written Opinion for International Application No. PCT/IB2021/051996, mailed on Jul. 18, 2021, 9 pages.
(Continued)

Primary Examiner — Marin Pichler
(74) Attorney, Agent, or Firm — Shichrur & Co.

(57) ABSTRACT

For example, a Head Mounted Display (HMD) may include a central display configured to display a first image in a central Field of View (FoV) based on an image scene to be displayed to a pupil of a user; a central lens configured to direct light of the first image toward the pupil of the user, a peripheral display configured to display a second image in a temporal FoV based on the image scene; and a peripheral lens configured to direct light of the second image toward the pupil of the user, the peripheral lens is tilted at a tilt angle relative to the central lens.

26 Claims, 18 Drawing Sheets

(56) References Cited

U.S. PATENT DOCUMENTS

| | | |
|---|---|---|
| 7,072,107 B2 | 7/2006 | Filipovich et al. |
| 7,542,210 B2 | 6/2009 | Chirieleison, Sr. |
| 9,632,315 B2 | 4/2017 | Smith et al. |
| 9,910,282 B2 | 3/2018 | Petrov |
| 10,025,101 B2 | 7/2018 | Wheelwright et al. |
| 10,261,319 B2 | 4/2019 | Spitzer et al. |
| 10,277,893 B1 | 4/2019 | Yoon et al. |
| 10,282,906 B2 | 5/2019 | Yonekubo |
| 10,288,885 B2 | 5/2019 | Makino |
| 10,310,598 B2 | 6/2019 | Trail et al. |
| 10,607,323 B2 | 3/2020 | Han et al. |
| 2002/0181115 A1 | 12/2002 | Massof et al. |
| 2004/0227703 A1 | 11/2004 | Amvik et al. |
| 2008/0002262 A1* | 1/2008 | Chirieleison ...... G02B 27/0172 359/630 |
| 2008/0106489 A1 | 5/2008 | Brown et al. |
| 2015/0187115 A1 | 7/2015 | Macdonald et al. |
| 2016/0198949 A1 | 7/2016 | Spitzer |
| 2016/0240013 A1 | 8/2016 | Spitzer |
| 2016/0377870 A1 | 12/2016 | Pilkinton et al. |
| 2017/0115489 A1* | 4/2017 | Hu ................... G02B 27/0172 |
| 2017/0139213 A1 | 5/2017 | Schmidtlin |
| 2017/0171533 A1 | 6/2017 | Benitez et al. |
| 2017/0285344 A1 | 10/2017 | Benko et al. |
| 2017/0336539 A1 | 11/2017 | Perreault et al. |
| 2017/0371162 A1 | 12/2017 | Makino |
| 2018/0074319 A1 | 3/2018 | Wheelwright et al. |
| 2019/0025472 A1 | 1/2019 | Cheng et al. |
| 2019/0026871 A1* | 1/2019 | Han .......................... G02B 3/02 |
| 2019/0049721 A1 | 2/2019 | Anton et al. |
| 2019/0155037 A1* | 5/2019 | Matsumura ............ G02B 25/04 |

FOREIGN PATENT DOCUMENTS

| | | |
|---|---|---|
| JP | 2011-145488 | 7/2011 |
| JP | 2016-127974 | 7/2016 |
| JP | 2016-134216 | 7/2016 |
| JP | 6902717 | 7/2021 |
| RU | 2 642 149 | 1/2018 |
| WO | 2016/141721 | 9/2016 |
| WO | 2017/071458 | 5/2017 |

OTHER PUBLICATIONS

International Preliminary Report on Patentability for International Application No. PCT/IB2021/051996, mailed on Sep. 22, 2022, 6 pages.

* cited by examiner

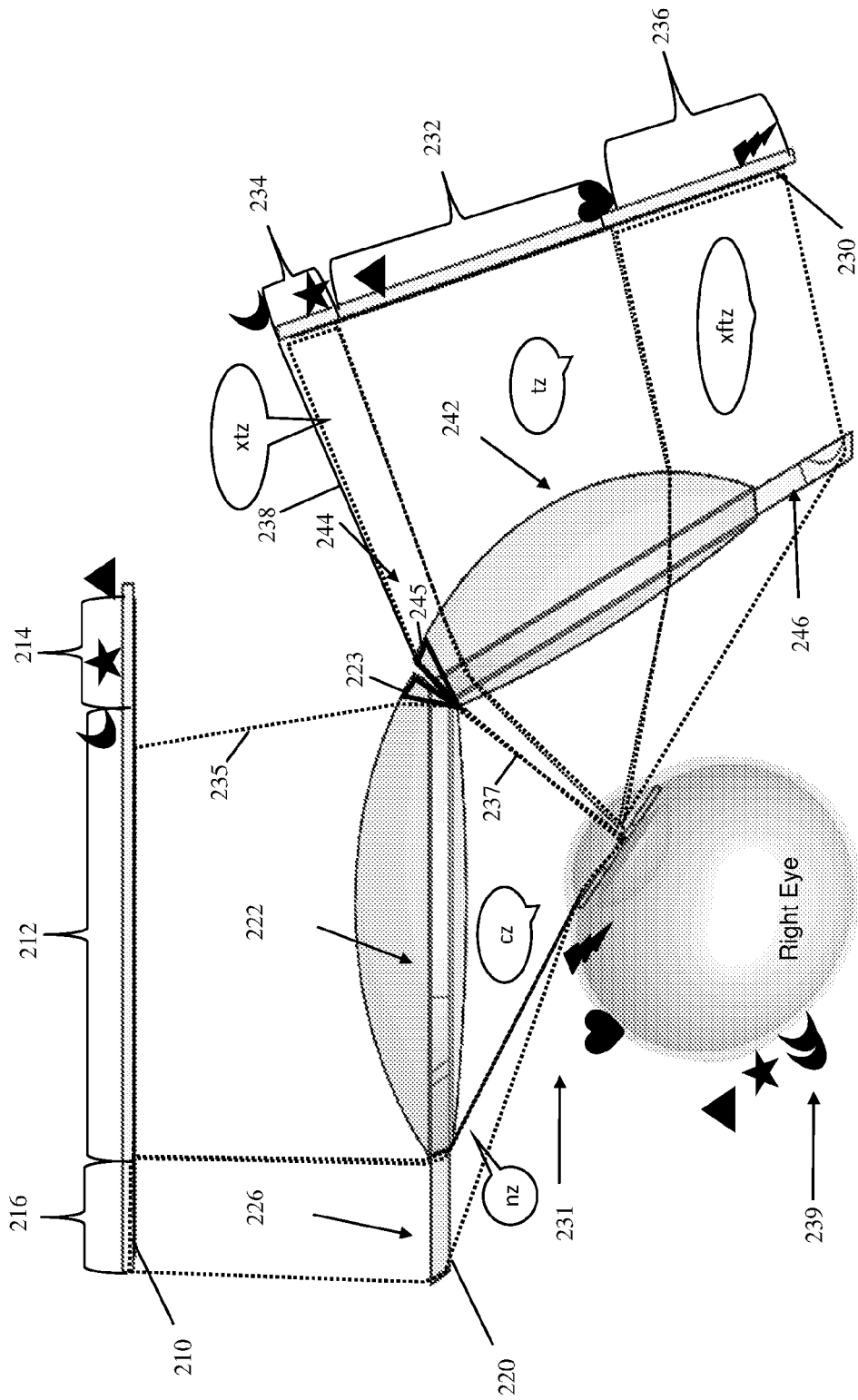

HEAD MOUNTED DISPLAY (HMD) APPARATUS, METHOD, AND SYSTEM

CROSS REFERENCE

This Application claims the benefit of and priority from U.S. Provisional Patent Application No. 62/988,148 entitled "WIDE FIELD OF VIEW VIRTUAL REALITY SYSTEM (VRDOM)", filed Mar. 11, 2020, the entire disclosure of which is incorporated herein by reference.

TECHNICAL FIELD

Embodiments described herein generally relate to a Head Mounted Display (HMD) device.

BACKGROUND

A Head Mounted Display (HMD) device may be mounted on a head of a user, e.g., in front of the eyes of the user.

The HMD may be used to display an image to the eyes of the user.

The HMD may be used, for example, for virtual reality games, simulators, and the like.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2C is a schematic illustration of the HMD viewed at a temporal gaze of the pupil, in accordance with some demonstrative embodiments.

DETAILED DESCRIPTION

Figure 1:
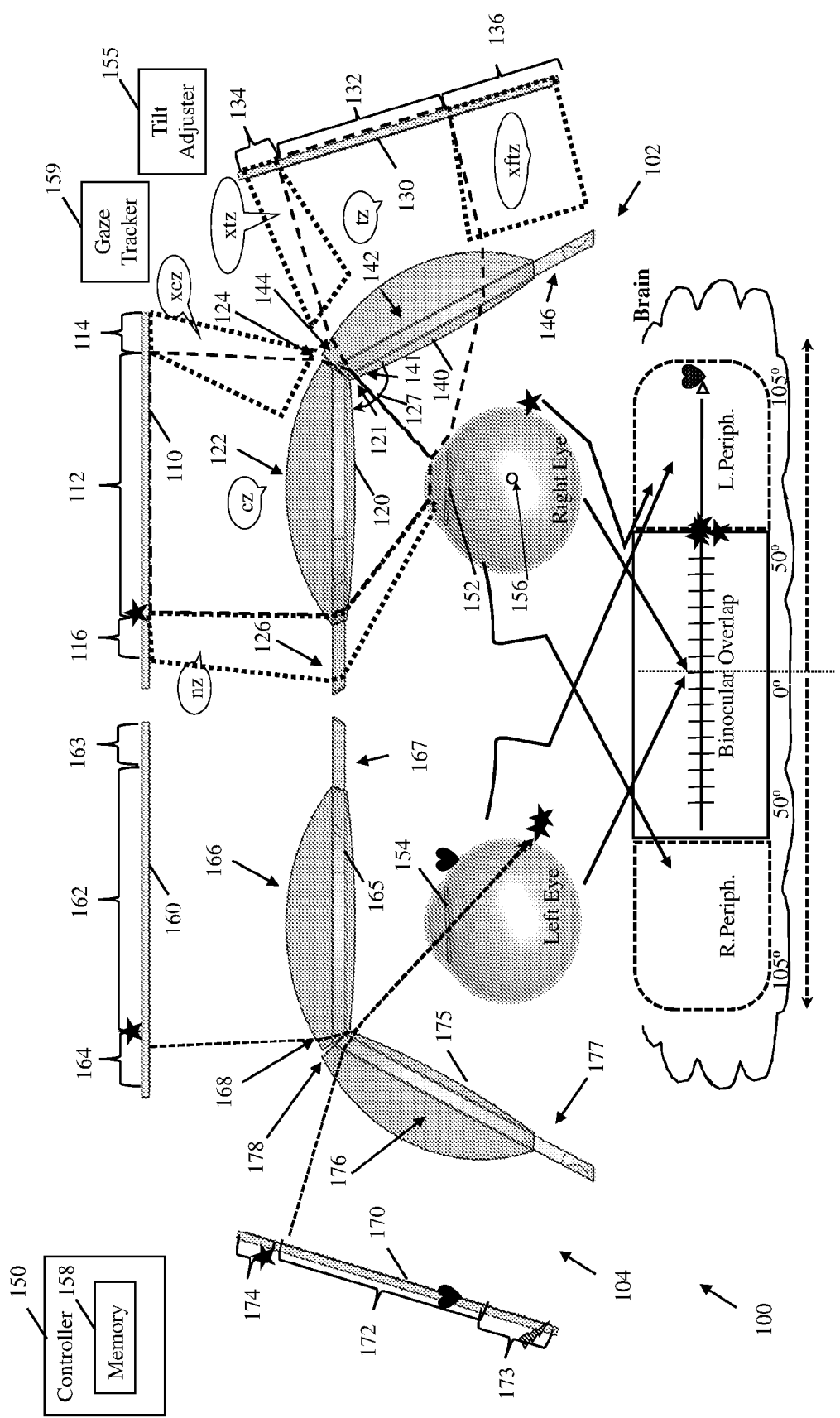
FIG. 1 is a schematic illustration of a Head Mounted Display (HMD) device, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., control circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

Reference is now made to FIG. 1, which schematically illustrates a Head Mounted Display (HMD) device 100, in accordance with some demonstrative embodiments.

In some demonstrative embodiments, HMD device 100 may be configured to be mounted and/or positioned in front eyes of a user. For example, HMD device 100 may be configured to be worn on a head of a user, or on a helmet, which may be worn on the head of the user.

In some demonstrative embodiments, HMD device 100 may be configured to display an image, e.g., a still image or a video image, to the user.

In some demonstrative embodiments, HMD device 100 may be implemented, for example, for displaying images of an Extended Reality (XR) application, a Virtual Reality (VR) application, an augmented reality application, a gaming application, an aviation application, a simulator, an engineering application, a medical application, and/or to display images of any other additional or alternative applications and/or implementations.

In some demonstrative embodiments, HMD device 100 may be configured to cover a wide Filed of View (FoV), e.g., as describe below.

In some demonstrative embodiments, HMD device 100 may be configured to cover a wide FoV, for example, to improve a sense of immersion, presence and/or performance for the user, for example, in tasks requiring peripheral vision, for example, in virtual environments and/or in augmented video-pass-through environments, e.g., as described below.

In one example, HMD device 100 may be configured to cover a wide temporal FoV, for example, to provide an effect of "None of the enemies could escape from the corner of your FoV, e.g., for a gamer in a VR game.

In another example, HMD device 100 may be configured for use by car racers and/or flight pilots in simulations, which may require to use a temporal FoV in real situations. For example, headsets covering a limited FoV may not be good enough for such training needs and, therefore, simulators using "dome projection" setups may be very complicated, and/or expensive. For example, HMD device 100 may make usage of the complicated and costly dome projections unnecessary.

In some demonstrative embodiments, HMD device 100 may be configured to cover, e.g., to completely cover, a human FoV, for example, including an extra FoV, which may be covered, for example, by eye rotations in a comfort zone, e.g., as described below.

In one example, a FoV completely covering the human FoV may provide an improved user experience, for example, for pass-through extended reality (pass-through XR) applications, for example, by having a "Reality" and "Virtuality" FoV that corresponds and simulates a human natural FoV.

In some demonstrative embodiments, HMD device 100 may be configured to cover a horizontal FoV of 270 degrees (°), e.g., as described below.

In one example, a human horizontal visual field may provide a horizontal FoV of 210°, for example, at a straight gaze of an eye of the user. According to this example, considering a horizontal eye rotation of about +/−30°, e.g., from the straight gaze, a maximal horizontal FoV may be 270°, e.g., 210°+2×30°=270°.

In other embodiments, HMD device 100 may be configured to cover any other horizontal FOV, e.g., less than or more than 270°.

In some demonstrative embodiments, HMD device 100 may be configured to cover a vertical FoV of 170 degrees, e.g., as described below.

In one example, a human vertical visual field may provide a vertical FOV of 120°, for example, 50° up and 70° down. According to this example, considering a vertical eye rotation of about +/−25°, e.g., from the straight gaze, a maximal vertical FoV may be 170°, e.g., ((50°+25°)+(70°+25°)) =170°.

In other embodiments, HMD device 100 may be configured to cover any other vertical FOV, e.g., less than or more than 170°.

In some demonstrative embodiments, HMD device 100 may be configured to cover a field of view of 270°×170°, for example, which may cover the human FoV, and an additional FOV covered by rotations of the eye from the straight gaze.

In some demonstrative embodiments, HMD device 100 may be configured to cover the wide FoV, for example, even without compromising a continuous FoV and/or visual clarity throughout the continuous FoV, e.g., as described below.

In some demonstrative embodiments, HMD device 100 may maintain the continuous FoV and/or the visual clarity, for example, for different eye gazes of the eye of the user, e.g., as described below.

In one example, HMD device 100 may be configured to cover the wide FoV, for example, even without having "black strips", "double vision sectors", and/or "seems" in the FoV. For example, HMD device 100 may be configured to cover the wide FoV, for example, even without compromising visual clarity in an area of eye rotation comfort zone, e.g., in a radius of up to about 30°, and/or in an area of eye enforced rotation, e.g., in a radius of up to about 45° from the straight gaze of the eye.

In some demonstrative embodiments, HMD device 100 may be configured to cover the wide FoV, for example, such that panoramic images and/or videos may be seen continuously by the user, for example, for any eye gaze fixation angle and/or for a convergence virtual distance, e.g., as described below.

In one example, in a natural environment, a visual scanning of a scene may be accomplished by a system of nested actions, for example, moving the head and body of a user within space, and moving eyes of the user within a visual field of the user. For example, a fastest scan may be done by the eyes, while the head and the body moves may be complimentary. For example, the eyes may jump from one scene location to another scene location, for example, a few times per second, e.g., in saccades.

According to this example, the visual scanning of the scene may build a reasonably complete representation of what is happening in the scene, although the eye may have high resolution only in a narrow window. For example, if any visual detail is important for understanding in the FoV, a coordination of the head and eye movements may point the eyes at a target and may allow to encode the target.

Therefore, for an HMD having a wide FoV, it may be advantageous, and in some cases, it may even be very important, to have a continuous FoV, e.g., for any gaze position, for example, for certain applications. For example, in case of "black-out" angles in the FoV, important stimulation data of the scene may be missed, and a goal of the scene may not be accomplished.

In some demonstrative embodiments, HMD device 100 may be configured to cover the wide FoV, for example, even without compromising a compactness, design and/or usability of HMD device 100, e.g., as described below.

In some demonstrative embodiments, HMD device 100 may support a wide range of lens-display focal distances, e.g., as described below.

In one example, HMD device 100 may support a lens-display focal distance in a range between 15 millimeter (mm) and 100 mm.

In another example, HMD device 100 may support a lens-display focal distance in a range between 25 mm and 40 mm.

In other embodiments, any other lens-display focal distance may be implemented.

In some demonstrative embodiments, HMD device 100 may be configured to cover the wide FoV, for example, while utilizing non-standard optical materials and/or non-standard manufacturing approaches, for example, which may be developed especially for cost effective mass production.

In some demonstrative embodiments, HMD device 100 may be configured to provide a continuous view and/or an optically optimized view at the wide FoV, for example, for a plurality of different eye-relief settings, e.g., as described below.

In some demonstrative embodiments, HMD device 100 may be configured to provide a continuous view and/or an optically optimized view at the wide FoV, for example, even when used by users suffering myopia and/or hyperopia, e.g., as described below.

In some demonstrative embodiments, HMD device 100 may be configured to provide a continuous view and/or an optically optimized view, for example, for different mountings of HMD device 100 relative to the head of the user, e.g., as described below. For example, HMD device 100 may provide a continuous view and/or an optically optimized view, for example, for a plurality of different tilt (pitch) angles of HMD device 100 relative to the head of the user, e.g., as described below.

In some demonstrative embodiments, HMD device 100 may be configured to display a panoramic image scene, e.g., as described below.

In some demonstrative embodiments, HMD device 100 may include a first HMD 102 to display an image scene, e.g., of the panoramic image scene, to a first pupil 152 of the user. For example, pupil 152 may be a pupil of a right eye of the user, e.g., as described below.

In some demonstrative embodiments, HMD device 100 may include a second HMD 104 to display another image scene, e.g., of the panoramic image scene, to a second pupil 154 of the user. For example, pupil 154 may be a pupil of a left eye of the user, e.g., as described below.

In some demonstrative embodiments, an HMD, e.g., HMD 102 and/or HMD 104, may be configured to include only a single central display and a single peripheral display, e.g., as described below.

In other embodiments, HMD 102 and/or HMD 104 may include more than one central display, and/or more than one peripheral display.

In some demonstrative embodiments, in some use cases and/or scenarios, there may be one or more disadvantages, inefficiencies, and/or technical problems, for example, when using a large number of displays, for example, a large number of central displays and/or a large number of peripheral displays. For example, an HMD may include a plurality of mini displays, and/or a plurality of micro displays, which may be configured and/or operated as a combined large display.

In one example, an HMD utilizing a large number of displays may require complex manufacturing, and/or operation procedures.

In another example, using a large number of displays from an HMD may increase an overall cost of the HMD, e.g., as a cost per display area of a mini display or a micro display may be much more expensive, e.g., 5 times higher, than a cost per area of a large display.

In one example, central display 110 and/or peripheral display 130 may be implemented by mini-displays. For example, a mini display may have a display size in a range of 1.5"-7". This implementation may be technically advantageous, for example, compared to an implementation using micro-displays with a display size of up to 1.8". For example, about 6 micro-displays may be required to cover the same FoV of a mini display. For example, an implementation using micro displays may have a total cost, which may be about 30 times higher than an implementation using mini display, e.g., for the same FoV, for example, if a cost of a micro-display is about five times higher than the cost of a mini display.

In some demonstrative embodiments, HMD 102 may include a Central Display (CD) 110, a central lens 120, a Peripheral Display (PD) 130, and a peripheral lens 140, e.g., as described below.

In some demonstrative embodiments, the peripheral lens 140 may be tilted at a tilt angle 127 relative to the central lens 120, e.g., as described below.

In some demonstrative embodiments, HMD 104 may include a CD 160, a central lens 165, a PD 170, and a peripheral lens 175, e.g., as described below.

In some demonstrative embodiments, a lens, e.g., central lens 120, central lens 165, peripheral lens 140 and/or peripheral lens 175, may be implemented utilizing any suitable optical structure, module, element and/or system. In one example, a lens, e.g., central lens 120, central lens 165, peripheral lens 140 and/or peripheral lens 175, may be implemented utilizing an optic lens. In another example, a lens, e.g., central lens 120, central lens 165, peripheral lens 140 and/or peripheral lens 175, may be implemented utilizing a lens module, a lens structure and/or a lens system.

In some demonstrative embodiments, the peripheral lens 175 may be tilted at a tilt angle, e.g., similar to or different from, the tile angle 127, relative to the central lens 165.

In some demonstrative embodiments, some, or even all elements of HMD 102 may be similar to, or even identical to, respective elements of HMD 104, e.g., as described below.

In other embodiments, some or all elements of HMD 102 may be different from respective portions of HMD 104.

In some demonstrative embodiments, central display 110 may include a central zone (cz) display area 112, an extended central zone (xcz) display area 114, and/or an extended nasal zone (nz) display area 116, e.g., as described below.

In some demonstrative embodiments, the xcz display area 114 may be adjacent to the cz display area 112, e.g., as described below.

In some demonstrative embodiments, the nz display area 116 may be adjacent to the cz display area 112, e.g., as described below.

In some demonstrative embodiments, the cz display area 112 may be between the xcz display area 114 and the nz display area 116, e.g., as described below.

In some demonstrative embodiments, central lens 120 may include a cz lens portion 122, an xcz lens portion 124, and/or an nz lens portion 126, e.g., as described below.

In some demonstrative embodiments, the xcz lens portion 124 may be adjacent to the cz lens portion 122, e.g., as described below.

In some demonstrative embodiments, the nz lens portion 126 may be adjacent to the cz lens portion 122, e.g., as described below.

In some demonstrative embodiments, the cz lens portion 122 may be between the xcz lens portion 124 and the nz lens portion 126, e.g., as described below.

In some demonstrative embodiments, peripheral display 130 may include a temporal zone (tz) display area 132, an extended temporal zone (xtz) display area 134, and/or an extended far temporal zone (xftz) display area 136, e.g., as described below.

In some demonstrative embodiments, the xtz display area 134 may be adjacent to the tz display area 132, e.g., as described below.

In some demonstrative embodiments, the xftz display area 136 may be adjacent to the tz display area 132, e.g., as described below.

In some demonstrative embodiments, the tz display area 132 may be between the xtz display area 134 and the xftz display area 136, e.g., as described below.

In some demonstrative embodiments, the peripheral lens 140 may include a tz lens portion 142, an xtz lens portion 144, and/or an xftz lens portion 146, e.g., as described below.

In some demonstrative embodiments, the xtz lens portion 144 may be adjacent to the tz lens portion 142, e.g., as described below.

In some demonstrative embodiments, the xftz lens portion 146 may be adjacent to the tz lens portion 142, e.g., as described below.

In some demonstrative embodiments, the tz lens portion 142 may be between the xtz lens portion 144 and the xftz lens portion 146, e.g., as described below.

In some demonstrative embodiments, central display 160 may include a cz display area 162, an xcz display area 164, and/or an nz display area 163.

In some demonstrative embodiments, central lens 165 may include a cz lens portion 166, an xcz lens portion 168, and/or an nz lens portion 167, e.g., as described below.

In some demonstrative embodiments, peripheral display 170 may include a tz display area 172, an xtz display area 174, and/or an xftz display area 173, e.g., as described below.

In some demonstrative embodiments, the peripheral lens 175 may include a tz lens portion 176, an xtz lens portion 178, and/or an xftz lens portion 177, e.g., as described below.

In some demonstrative embodiments, lens 120 and/or lens 140 may be configured, for example, according to a hybrid lens configuration, e.g., as described below.

In other embodiments, lens 120 and/or lens 140 may be configured according to any other configuration.

In some demonstrative embodiments, lens 165 and/or lens 175 may be configured, for example, according to a hybrid lens configuration, e.g., as described below.

In other embodiments, lens 165 and/or lens 175 may be configured according to any other configuration.

In some demonstrative embodiments, the hybrid lens configuration may include a freeform lens, e.g., an aspherical lens, for central vision, and a freeform Fresnel refractive lens for peripheral vision, e.g., as described below.

For example, lens 120 and/or lens 165 may include a freeform lens; and/or lens 140 and/or lens 175 may include freeform Fresnel refractive lens, e.g., as described below.

In other embodiments, lens 120, lens 165, lens 140, and/or lens 175 may include any other type of lens.

In some demonstrative embodiments, central display 110 may be configured to display a first image in a central FoV, for example, based on the image scene to be displayed to the pupil 152, e.g., as described below.

In some demonstrative embodiments, the cz display area 112 may be configured to display a cz portion of the first image, e.g., as described below.

In some demonstrative embodiments, the xcz display area 114 may be configured to display an xcz portion of the first image, e.g., as described below.

In some demonstrative embodiments, the nz display 116 area may be configured to display an nz portion of the first image, e.g., as described below.

In some demonstrative embodiments, central lens 120 may be configured to direct light of the first image toward the pupil 152, e.g., as described below.

In some demonstrative embodiments, the cz lens portion 122 may be configured to direct light of the cz portion of the first image toward the pupil 152, for example, at a straight gaze of the pupil 152, at a nasal gaze of the pupil 152, and/or at a temporal gaze of the pupil 152, e.g., as described below.

In some demonstrative embodiments, the straight gaze of the pupil 152 may be defined as a gaze of the pupil 152 towards a center of the image scene. For example, the straight gaze may be defined to be around a visual axis of 0 degrees, for example, in a range between +5 and −5 degrees relative to the visual axis. In other embodiments, the straight gaze may be defined in any other range of angles relative to the visual axis.

In some demonstrative embodiments, a positive horizontal angle of the pupil 152 may be defined in a direction toward the nose of the user, and a negative horizontal angle of the pupil 152 may be defined in a direction toward the ear of the user.

In some demonstrative embodiments, the nasal gaze may be defined as a gaze, which is not a straight gaze, and which is in a direction towards the nose of the user. For example, the nasal gaze may be between 0 degrees and a maximal supported positive gaze angle towards the nose.

In one example, the nasal gaze may be defined between angles of 0 and 70 degrees, for example, at an enforced rotation of the eye.

In another example, the nasal gaze may be defined between angles of 0 and 20 degrees, for example, in a comfort zone.

In other embodiments, the nasal gaze may be defined in any other range of angles.

In some demonstrative embodiments, the temporal gaze may be defined as a gaze, which is not a straight gaze, and which in a direction away from the nose of the user, e.g., towards the ear of the user. For example, the temporal gaze may be between 0 degrees and a maximal supported negative gaze angle towards the ear.

In one example, the temporal gaze may be defined between angles of 0 and −70 degrees, for example, at an enforced rotation of the eye.

In another example, the temporal gaze may be defined between angles of 0 and −20 degrees, for example, in a comfort zone of the eye.

In other embodiments, the temporal gaze may be defined in any other range of angles.

In some demonstrative embodiments, the cz lens portion 122 and the cz display area 112 may be configured to support rotational gaze optimization of the pupil 152 up to a maximal design choice, for example, for a left gaze, a right gaze, an up gaze, and/or a down gaze, e.g., as described below.

In some demonstrative embodiments, the xcz lens portion 124 may be configured to direct light of the xcz portion of the first image toward the pupil 152, for example, at the nasal gaze of the pupil 152, e.g., as described below.

In one example, the xcz lens portion 124 and the xcz display area 114 may be configured to support continuous FoV at the nasal gaze of the pupil 152, for example, of a maximal design choice, e.g., as described below.

In some demonstrative embodiments, the nz lens portion 124 may be configured to direct light of the nz portion of the first image toward the pupil 152, for example, at the straight gaze of the pupil 152, the temporal gaze of the pupil 152, and/or the nasal gaze of the pupil 152, e.g., as described below.

In one example, the nz lens portion 126 and the nz display area 116 may be configured to support a straight gaze peripheral FoV optimization, and/or an upper zone (uz) and a down zone (dz), for example, for vertical gazes of the pupil 152, e.g., as described below.

In some demonstrative embodiments, peripheral display 130 may be configured to display a second image in a temporal FoV, for example, based on the image scene, e.g., as described below.

In some demonstrative embodiments, the tz display area 132 may be configured to display a tz portion of the second image, e.g., as described below.

In some demonstrative embodiments, the xtz display area 134 may be configured to display an xtz portion of the second image, e.g., as described below.

In some demonstrative embodiments, the xftz display area 136 may be configured to display an xftz portion of the second image, e.g., as described below.

In some demonstrative embodiments, the peripheral lens 140 may be configured to direct light of the second image toward the pupil 152, e.g., as described below, In some demonstrative embodiments, the tz lens portion 142 may be configured to direct light of the tz portion of the second image toward the pupil 152, for example, at the straight gaze of the pupil 152, the temporal gaze of the pupil 152, and/or the nasal gaze of the pupil 152, e.g., as described below.

In one example, the tz lens portion 142 and the tz display area 132 may be configured to support a temporal zone and continuation of the cz display area 112 at a straight gaze of the pupil 152, e.g., as described below.

In some demonstrative embodiments, the xtz lens portion 144 may be configured to direct light of the xtz portion of the second image toward the pupil 152, for example, at the temporal gaze of the pupil 152, e.g., as described below.

In one example, the xtz lens portion 144 and the xtz display area 134 may be configured to support continuous FoV under temporal gaze of the pupil 152, for example, for a maximal design choice, e.g., as described below.

In some demonstrative embodiments, the xftz lens portion 146 may be configured to direct light of the xftz portion of the second image toward the pupil 152, for example, at the temporal gaze of the pupil 152, e.g., as described below.

In one example, the xftz lens portion 146 and the xftz display area 136 may be configured to support up to a maximal temporal FoV for temporal gaze of the pupil 152, for example, for a maximal design choice, e.g., as described below.

In some demonstrative embodiments, each of the central FoV and/or the temporal FoV may include a horizontal FoV of at least 45 degrees, e.g., as described below.

In some demonstrative embodiments, each of the central FoV and/or the temporal FoV may include a horizontal FoV of at least 60 degrees, e.g., as described below.

In some demonstrative embodiments, each of the central FoV and/or the temporal FoV may include a horizontal FoV of at least 70 degrees, e.g., as described below.

In some demonstrative embodiments, each of the central FoV and/or the temporal FoV may include a horizontal FoV of at least 80 degrees, e.g., as described below.

In some demonstrative embodiments, each of the central FoV and/or the temporal FoV may include a vertical FoV of at least 80 degrees, e.g., as described below.

In some demonstrative embodiments, the central FoV and/or the temporal FoV may be configured to form a continuous horizontal FoV of at least 130 degrees, for example, for a monocular FoV at a nasal FoV of at least 30 degrees, e.g., as described below.

In one example, the central FoV may form a first continuous horizontal FoV of 80 degrees and the temporal FoV may form a second continuous horizontal FoV of 80, e.g., at the straight gaze of the pupil 152. According to this example, with an overlap of 30 degrees, a continuous horizontal FoV of at least 130 degrees may be formed.

In some demonstrative embodiments, the central FoV and the temporal FoV may be configured to form a continuous horizontal FoV of at least 180 degrees, for example, for a monocular FoV at a nasal FoV of at least 40 degrees.

In one example, the central FoV may form a continuous horizontal FoV of 85 degrees, and/or the temporal FoV may form a continuous horizontal FoV of 125, e.g., at the straight gaze of the pupil 152. According to this example, with an overlap of 30 degrees, a continuous horizontal FoV of at least 180 degrees may be formed.

In some demonstrative embodiments, the central FoV and the temporal FoV may be configured to form a continuous horizontal FoV of at least 200 degrees, for example, for a monocular FoV at a nasal FoV of at least 50 degrees, e.g., as described below.

In one example, the central FoV may form a continuous horizontal FoV of 95 degrees, and/or the temporal FoV may form a continuous horizontal FoV of 135 degrees, e.g., at an enforced straight gaze and temporal gaze of the pupil 152. According to this example, with an overlap of 30 degrees, a continuous horizontal FoV of at least 200 degrees may be formed.

In some demonstrative embodiments, HMD 102 may be configured to provide a continuous nasal gaze FoV to the pupil 152 at the nasal gaze, e.g., as described below.

In some demonstrative embodiments, the continuous nasal gaze FoV may include the light of the cz portion of the first image directed by the cz lens portion 122 toward the pupil 152 at the nasal gaze; the light of the xcz portion of the first image directed by the xcz lens portion 124 toward the pupil 152 at the nasal gaze; and/or the light of the tz portion of the second image directed by the tz lens portion 142 toward the pupil 152 at the nasal gaze, e.g., as described below.

In some demonstrative embodiments, HMD 102 may be configured to provide a continuous temporal gaze FoV to the pupil 152 at the temporal gaze, e.g., as described below.

In some demonstrative embodiments, the continuous temporal gaze FoV may include the light of the cz portion of the first image directed by the cz lens portion 122 toward the pupil 152 at the temporal gaze; the light of the xtz portion of the second image directed by the xtz lens portion 144 toward the pupil 152 at the temporal gaze; and/or the light of the tz portion of the second image directed by the tz lens portion 142 toward the pupil 152 at the temporal gaze, e.g., as described below.

In some demonstrative embodiments, HMD 102 may be configured to provide a continuous straight gaze FoV to the pupil 152 at the straight gaze, e.g., as described below.

In some demonstrative embodiments, the continuous straight gaze FoV may include the light of the cz portion of the first image directed by the cz lens portion 122 toward the pupil 152 at the straight gaze; and the light of the tz portion of the second image directed by the tz lens portion 142 toward the pupil 152 at the straight gaze, e.g., as described below.

Figure 2A:
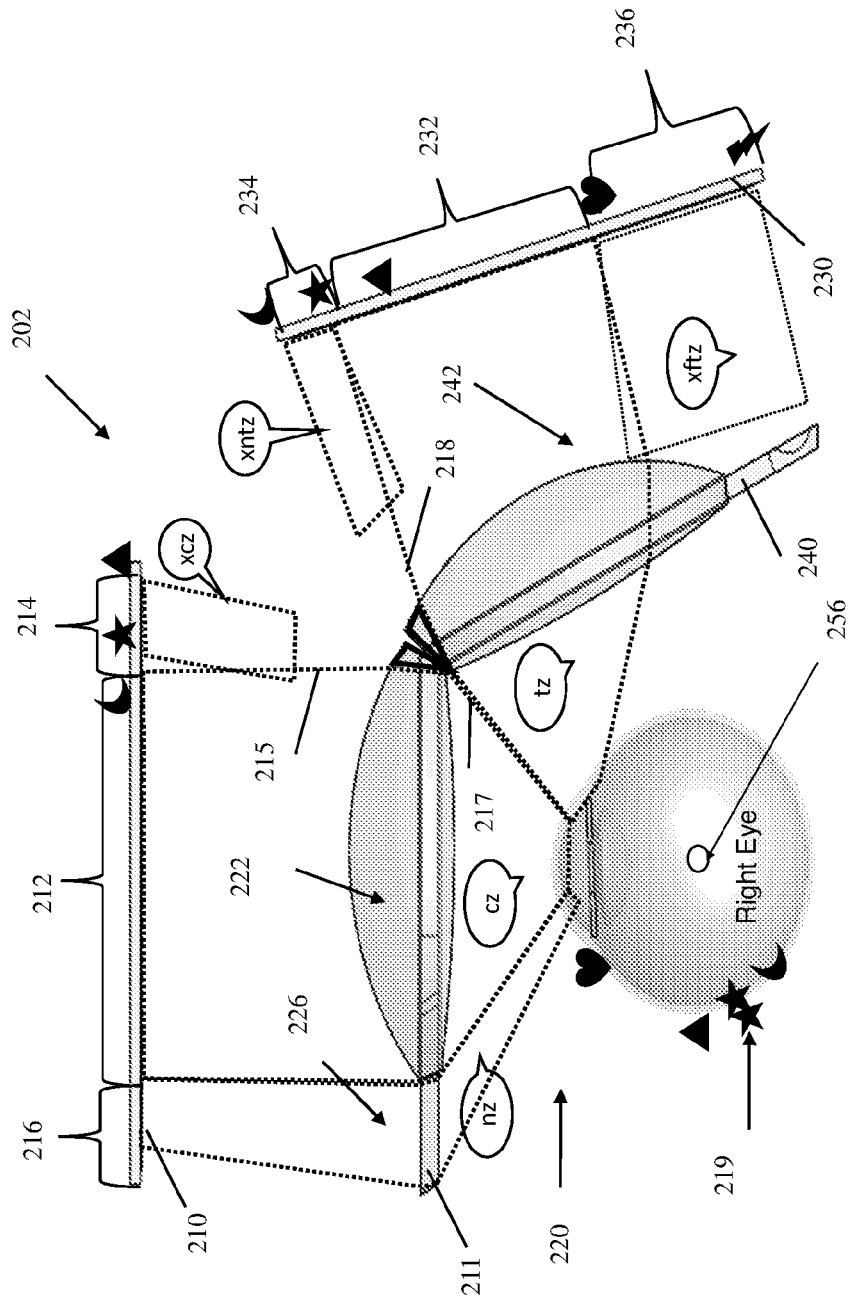
FIG. 2A is a schematic illustration of an HMD viewed at a straight gaze of a pupil.
Figure 2B:
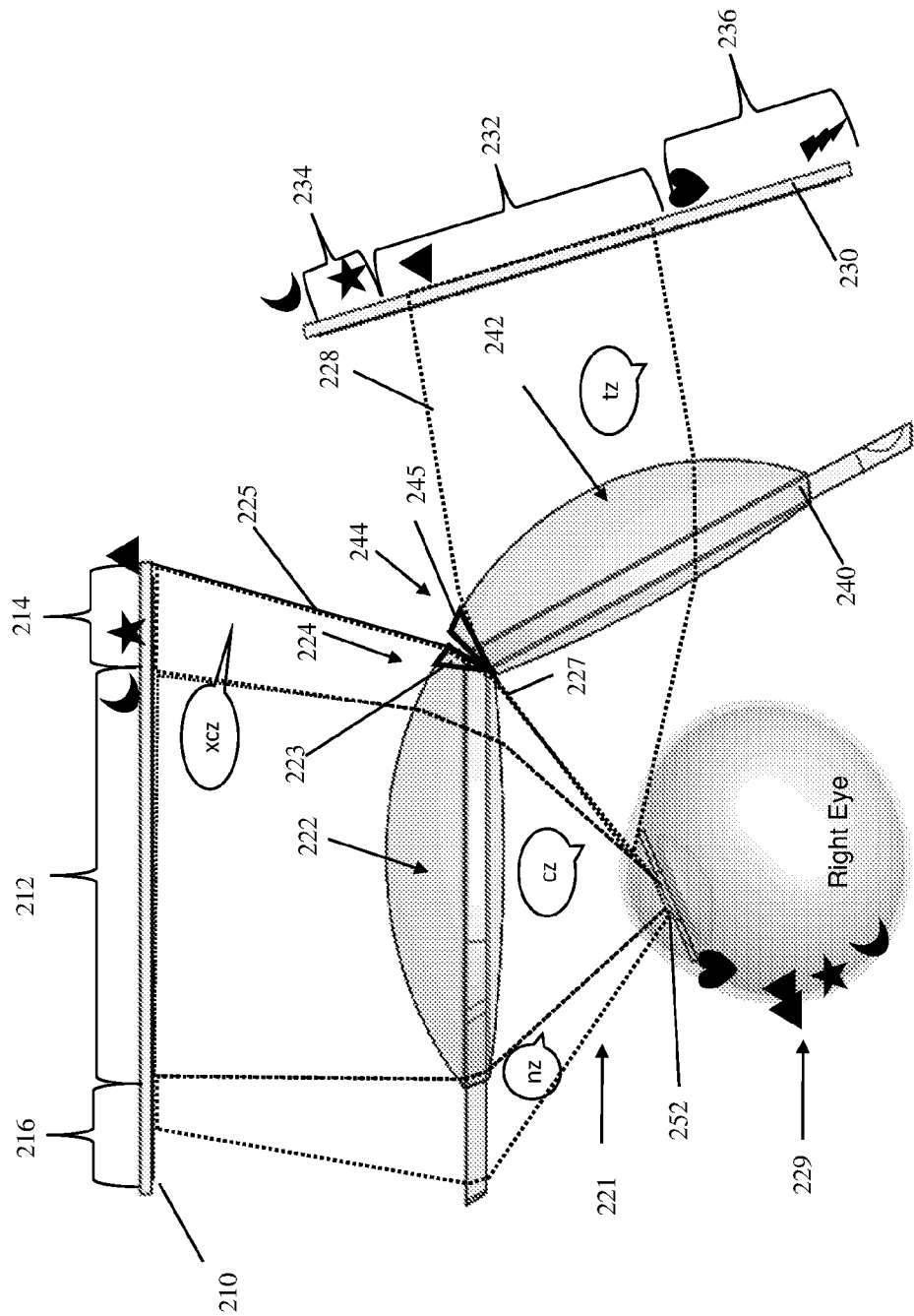
FIG. 2B is a schematic illustration of the HMD viewed at a nasal gaze of the pupil.

Reference is made to FIG. 2A, which schematically illustrates an HMD 202 viewed at a straight gaze of a pupil 252, to FIG. 2B, which schematically illustrates the HMD 202 viewed at a nasal gaze of pupil 252, and to FIG. 2C, which schematically illustrates the HMD 202 viewed at a temporal gaze of pupil 252, in accordance with some demonstrative embodiments. For example, HMD 102 (FIG. 1) may include one or more elements of HMD 202, and/or may perform one or more operations of, and/or one or more functionalities of, HMD 202.

In some demonstrative embodiments, as shown in FIGS. 2A-2C, HMD 202 may include a central display 210, a central lens 220, a peripheral display 230, and/or a peripheral lens 240, e.g., as described below.

In some demonstrative embodiments, as shown in FIGS. 2A-2C, central display 210 may include a cz display area 212, an xcz display area 214, and/or an nz display area 216. For example, central display 110 (FIG. 1) may include one or more elements of central display 210, and/or may perform one or more operations of, and/or one or more functionalities of, central display 210.

In some demonstrative embodiments, as shown in FIGS. 2A-2C, central lens 220 may include a cz lens portion 222, an xcz lens portion 224, and/or an nz lens portion 226. For example, central lens 120 (FIG. 1) may include one or more elements of central lens 220, and/or may perform one or more operations of, and/or one or more functionalities of, central lens 220.

In some demonstrative embodiments, as shown in FIGS. 2A-2C, peripheral display 230 may include a tz display area 232, an xtz display area 234, and/or an xftz display area 236, e.g., as described below. For example, peripheral display 130 (FIG. 1) may include one or more elements of peripheral display 230, and/or may perform one or more operations of, and/or one or more functionalities of, peripheral display 230.

In some demonstrative embodiments, as shown in FIGS. 2A-2C, the peripheral lens 240 may include a tz lens portion 242, an xtz lens portion 244, and/or an xftz lens portion 246, e.g., as described below. For example, peripheral lens 140 (FIG. 1) may include one or more elements of peripheral lens 240, and/or may perform one or more operations of, and/or one or more functionalities of, peripheral lens 240.

In some demonstrative embodiments, HMD 202 may be configured to provide a continues FoV, for example, for substantially any gaze direction, e.g., as described below.

In some demonstrative embodiments, HMD 202 may be configured to provide a continuous image, for example, on transitions between lenses, e.g., between central lens 220 and peripheral lens 240, for example, at different eye gazes of pupil 252, e.g., as described below.

In some demonstrative embodiments, as shown in FIG. 2A, HMD 202 may be configured to provide a continuous straight gaze FoV 211 to the pupil 252 at the straight gaze, e.g., as described below.

In some demonstrative embodiments, as shown in FIG. 2A, the continuous straight gaze FoV 211 may include light of a cz portion of a first image directed by the cz lens portion 222 toward the pupil 252 at the straight gaze, and light of a tz portion of a second image directed by the tz lens portion 242 toward the pupil 252 at the straight gaze.

In some demonstrative embodiments, as shown in FIG. 2A, for the straight gaze, a central right-eye FoV may include an object "black star", e.g., near a boundary of the xcz display area 214.

In some demonstrative embodiments, as shown in FIG. 2A, for the straight gaze, a temporal right-eye FoV may also include the same object "black star, e.g., near a boundary of the tz display area 232.

In some demonstrative embodiments, as shown in FIG. 2A, the black star objects may generate chief rays 215 and 218, which may be refracted by corresponding lens portions. For example, chief ray 215 may be refracted by cz lens portion 222 and/or chief ray 218 may be refracted by tz lens portion 242.

In some demonstrative embodiments, as shown in FIG. 2A, there may be a tangential line between central lens 220 and peripheral lens 240, such that the chief rays 215 and 218 may exit through the respective lens portions via the tangential line, for example, in a collinear manner, to form a single, combined, chief ray 217.

In some demonstrative embodiments, as shown in FIG. 2A, rays generated by the black star objects may be collimated by central lens 220 and peripheral lens 240, e.g., before hitting the pupil 252, and may be focused by the eye toward a same point 219 on a retina of the eye. For example, the black star objects generated in the different displays, e.g., central display 210 and peripheral display 230, may be perceived as a single object by the eye/brain, e.g., at point 219. Therefore, a continuous image may be perceived on a boundary between central lens 220 and peripheral lens 240.

In some demonstrative embodiments, as shown in FIG. 2A, the continuous straight gaze FoV 211 may be formed by an nz FoV, denoted nz, a cz FoV, denoted cz, and a tz FoV, denoted tz.

In some demonstrative embodiments, as shown in FIG. 2A, the nz FoV may include a FoV extension for objects in the nasal FoV refracted by the nz lens portion 226.

In some demonstrative embodiments, as shown in FIG. 2A, the cz FoV may correspond to a central zone corresponding to objects for which rays are refracted by cz lens portion 222.

In some demonstrative embodiments, as shown in FIG. 2A, the tz FoV may be a continuous transition of the cz FoV, e.g., for the straight gazing eye.

In some demonstrative embodiments, as shown in FIG. 2A, the continuous straight gaze FoV 211 may not include an xcz FoV, denoted xcz, an xtz FoV, denoted xtz, and/or an xftz FoV, denoted xftz.

In some demonstrative embodiments, as shown in FIG. 2A, the xcz FoV, the xtz FoV, and/or the xftz FoV may not be seen by the straight gazing eye.

In some demonstrative embodiments, the xcz FoV may be utilized for the nasal gaze, e.g., as described below.

In some demonstrative embodiments, the xtz FoV may be utilized for the peripheral gaze, as described below.

In some demonstrative embodiments, as shown in FIG. 2A, the xftz FoV may be utilized for the peripheral gaze, e.g., as described below.

In some demonstrative embodiments, as shown in FIG. 2B, HMD 202 may be configured to provide a continuous nasal gaze FoV 221 to the pupil 252 at the nasal gaze, e.g., as described below.

In some demonstrative embodiments, as shown in FIG. 2B, the continuous nasal gaze FoV 221 may include light of the cz portion of the first image directed by the cz lens portion 222 toward the pupil 252 at the nasal gaze, light of an xcz portion of the first image directed by the xcz lens portion 224 toward the pupil 252 at the nasal gaze, and/or light of the tz portion of the second image directed by the tz lens portion 242 toward the pupil 252 at the nasal gaze.

In some demonstrative embodiments, as shown in FIGS. 2A-2C, the central lens 220 may include a side-cut 223, which may be configured to direct light from an edge area of central display 210 towards the pupil, e.g., as described below.

In some demonstrative embodiments, as shown in FIG. 2B, side-cut 223 may be configured to direct light from an edge of central display 210, e.g., an edge of xcz display area 214, towards the pupil 252 at the nasal gaze.

In some demonstrative embodiments, as shown in FIG. 2B, for the nasal gaze, the central right-eye FoV may include an object "black triangle", e.g., near a boundary of the xcz display area 214, e.g., a distal edge of the xcz display area 214, which is opposite to the boundary area between xcz display area 214 and cz display area 212.

In some demonstrative embodiments, as shown in FIG. 2B, for the nasal gaze, the right temporal FoV may also include the same object "black triangle", e.g., near a boundary of the tz display area 232.

In some demonstrative embodiments, as shown in FIG. 2B, the black triangle objects may generate chief rays 225 and 228, which may be refracted by corresponding lens portions. For example, chief ray 225 may be refracted by the side-cut 223 of xcz lens portion 224, and/or chief ray 228 may be refracted by tz lens portion 242.

In some demonstrative embodiments, as shown in FIG. 2B, the side-cut 223 may be configured such that chief rays 225 and 228 may be collimated to form a single chief ray 227, and may be focused by the eye toward a same point 229 on the retina of the eye. Therefore, the black triangle objects may be perceived as a single object by the eye/brain.

In some demonstrative embodiments, as shown in FIG. 2B, rays from peripheral display 230 in the portion above the "black triangle" may not reach the pupil 252, and therefore, the portion above the "black triangle" may be invisible to the user.

In some demonstrative embodiments, as shown in FIG. 2B, to preserve a continuous FoV at the nasal gaze, the central display 220 may include the xcz display area 214 to cover the "black triangle" point, for example, to support viewing of the black triangle at the nasal gaze.

In some demonstrative embodiments, as shown in FIG. 2B, once the eye rotates towards the nasal zone, the xcz FoV may be seen, and collimated rays coming from the xcz FoV may hit the pupil 252, to produce an image on the mid-peripheral zone of the retina, e.g., dependent on an eye rotation amplitude. Therefore, a continuous panoramic image may be sustained at the nasal gaze.

In some demonstrative embodiments, as shown in FIG. 2C, HMD 202 may be configured to provide a continuous temporal gaze FoV 231 to the pupil 252 at the temporal gaze, e.g., as described below.

In some demonstrative embodiments, as shown in FIG. 2C, the continuous temporal gaze FoV 231 may include light of the cz portion of the first image directed by the cz lens portion 222 toward the pupil 252 at the temporal gaze, light of the xtz portion of the second image directed by the xtz lens portion 244 toward the pupil 252 at the temporal gaze, and light of the tz portion of the second image directed by the tz lens portion 242 toward the pupil 252 at the temporal gaze.

In some demonstrative embodiments, as shown in FIGS. 2A-2C, the peripheral lens 240 may include a side-cut 245, which may be configured to direct light from an edge area of peripheral display 230 towards the pupil, e.g., as described below.

In some demonstrative embodiments, as shown in FIG. 2C, side-cut 245 may be configured to direct light from an edge of peripheral display 230, e.g., an edge of xtz display area 234, towards the pupil 252 at the temporal gaze.

In some demonstrative embodiments, as shown in FIG. 2C, for the peripheral gaze, the central right-eye FoV may include an object "black moon", e.g., near a boundary of the cz display area 212.

In some demonstrative embodiments, as shown in FIG. 2C, for the peripheral gaze, the temporal right-eye FoV may also include the same object "black moon", e.g., near a boundary of the xtz display area 234, e.g., a distal edge of the xtz display area 234 which is opposite to the boundary area between xtz display area 234 and tz display area 232.

In some demonstrative embodiments, as shown in FIG. 2C, the black moon objects may generate chief rays 235 and 238, which may be refracted by corresponding lens portions. For example, chief ray 235 may be refracted by cz lens portion 224, and/or chief ray 238 may be refracted by the side cut 245 of xtz lens portion 244.

In some demonstrative embodiments, as shown in FIG. 2C, the side-cut 245 may be configured such that chief rays 235 and 238 may be collimated to form a single chief ray 237, which may be focused by the eye toward a same point 239 on the retina of the eye. Therefore, the black moon objects may be perceived as a single object by the eye/brain.

In some demonstrative embodiments, as shown in FIG. 2C, rays from central display 210 in a portion, which is right from the "black moon", may not reach the pupil 252, and therefore, this portion of central display 210 may be invisible to the user.

In some demonstrative embodiments, as shown in FIG. 2C, to preserve a continuous FoV at the peripheral gaze, the peripheral display 230 may include the xtz display area 234, which may cover the black moon point, e.g., at least until the point of the black star object, for example, to support viewing of the black moon at the peripheral gaze.

In some demonstrative embodiments, as shown in FIG. 2C, the xtz FoV may overlap with the cz FoV, for example, to provide a continuous FoV at the temporal gaze.

In one example, once the eye is rotated towards the temporal gaze, a boundary area of the cz FoV may not be seen, and collimated rays coming from the xtz FoV may hit the pupil 252, to produce an image on the central/near/mid-peripheral zone of the retina, e.g., dependent on an eye rotation amplitude. Therefore, a continuous panoramic image may be sustained at the peripheral gaze, e.g., as described below.

In some demonstrative embodiments, as shown in FIG. 2C, the xftz FoV may provide a horizontal FoV of up to the maximal far-peripheral gaze, which may be around 105°, or any other angle.

In one example, once the eye is rotated towards the temporal gaze, a far-peripheral viewing zone may be extended towards the xftz FoV, for example, based on an eye rotation amplitude. For example, in order to provide virtual content in the far-peripheral zone, the xftz FoV may be used to avoid "black zones", for example, at an additional 30° or more of the eye rotation towards the temporal side.

In some demonstrative embodiments, HMD 202 may be configured to provide a wide FoV for viewing images from central display 210, e.g., as described below.

In one example, HMD 202 may be configured to provide a temporal FoV of up to at least 35°, or any other angle, for a straight gazing eye, e.g., for perceiving images from central display 210, e.g., as described below.

In another example, HMD 202 may be configured to provide a temporal FoV of at up to least 35°-40°, or any other angle, for an eye maximal rotation to the nasal direction, e.g., for perceiving images from central display 210, e.g., as described below.

In another example, HMD 202 may be configured to provide a temporal FoV of up to at least 30°, or any other angle, for eye maximal rotation to the temporal direction, e.g., for perceiving images from central display 210, e.g., as described below.

In some demonstrative embodiments, HMD 202 may be configured to provide a wide FoV for images from peripheral display 230, e.g., as described below.

In one example, HMD 202 may be configured to provide a horizontal FoV, which may be displaced, e.g., by at most 30°, or any other angle, from a straight gaze axis to a temporal side, for example, such that an eye maximally rotated to the temporal side may perceive images from peripheral display 230, and/or such that at least a 5° temporal gaze overlap may be created, e.g., as described below.

In some demonstrative embodiments, HMD 202 may be configured to provide a temporal FoV, which may be stretched by peripheral display 230, for example, by at least an additional 80°, or any other angle, into the temporal side, e.g., up to a total of at least 110°, or any other angle. For example, stretched temporal FoV may include a nasal gaze overlap, which may be displaced by an angle in a range of at least 35° to 40°, or any other angle, e.g., as described below.

In other embodiments, HMD 202 may be configured to provide any other wider or narrower FoV.

Referring back to FIG. 1, in some demonstrative embodiments, one or more parts of central lens 120 may be configured to direct light to a center 156 of eye rotation corresponding to the pupil 152, and/or one or more other parts of central lens 120 may be configured to direct light to one or more other points on the pupil 152, e.g., as described below.

In some demonstrative embodiments, a first part of the cz lens portion 122 may be configured to direct light beams from the xcz display area 124, and from a first part of the cz display area 122 to the center of the eye rotation corresponding to the pupil 152, e.g., as described below.

In some demonstrative embodiments, a second part of the cz lens portion 122 may be configured to direct light beams from a second part of the cz display area 122 to a point defined, for example, based on a position of the pupil 152 at the straight gaze angle, e.g., as described below.

In some demonstrative embodiments, the xcz lens portion 124 may be configured to direct light beams from the xcz display area 124 to a point defined, for example, based on a position of the pupil 152 at the nasal gaze angle, e.g., as described below.

In some demonstrative embodiments, the first part of the cz lens portion 122 may be between the xcz lens portion 124 and the second part of the cz lens portion 122, e.g., as described below.

In some demonstrative embodiments, one or more parts of peripheral lens 140 may be configured to direct light to the center of the eye rotation corresponding to the pupil 152, and/or one or more other parts of peripheral lens 140 may be configured to direct light to one or more other points on the pupil 152, e.g., as described below.

In some demonstrative embodiments, the tz lens portion 142 may be configured to direct light beams from the tz display area 132 to a point defined, for example, based on a position of the pupil 152 at the straight gaze angle, e.g., as described below.

In some demonstrative embodiments, the xtz lens portion 144 may be configured to direct light beams from the xtz display area 134 to the center of the eye rotation corresponding to the pupil 152, e.g., as described below.

In some demonstrative embodiments, the xftz lens portion 146 may be configured to direct light beams from the xftz display area 136 to a point defined, for example, based on a position of the pupil 152 at the temporal gaze angle, e.g., as described below.

In some demonstrative embodiments, a top part and/or a bottom part of the central lens 120 may be configured to direct light beams from the cz display area 122 to a point defined, for example, based on a position of the pupil 152 at the straight gaze angle, e.g., as described below.

In some demonstrative embodiments, a middle part of the central lens 120, which is between the top part and the bottom part of the central lens 120, may be configured to direct light beams from the cz display area 122 to the center of the eye rotation corresponding to the pupil 152, e.g., as described below.

In other embodiments, one or more, e.g., some or all, portions of the lens 120 and/or the lens 140 may be configured according to any other optical setting.

Figure 3B:
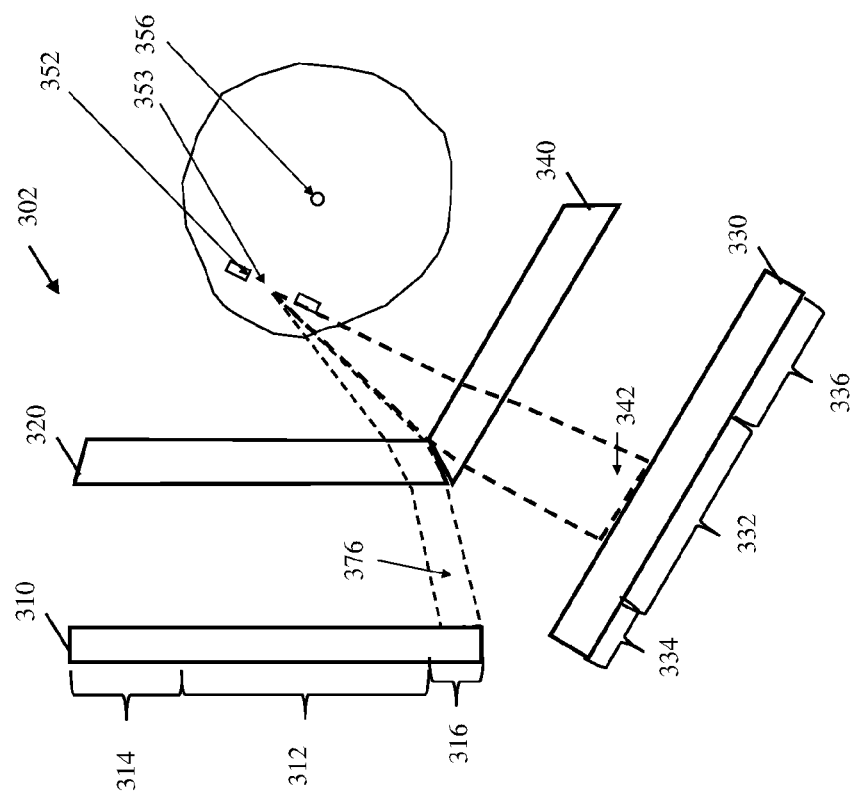
FIGS. 3A-3C are schematic illustrations of a top view of an HMD.
Figure 3A:
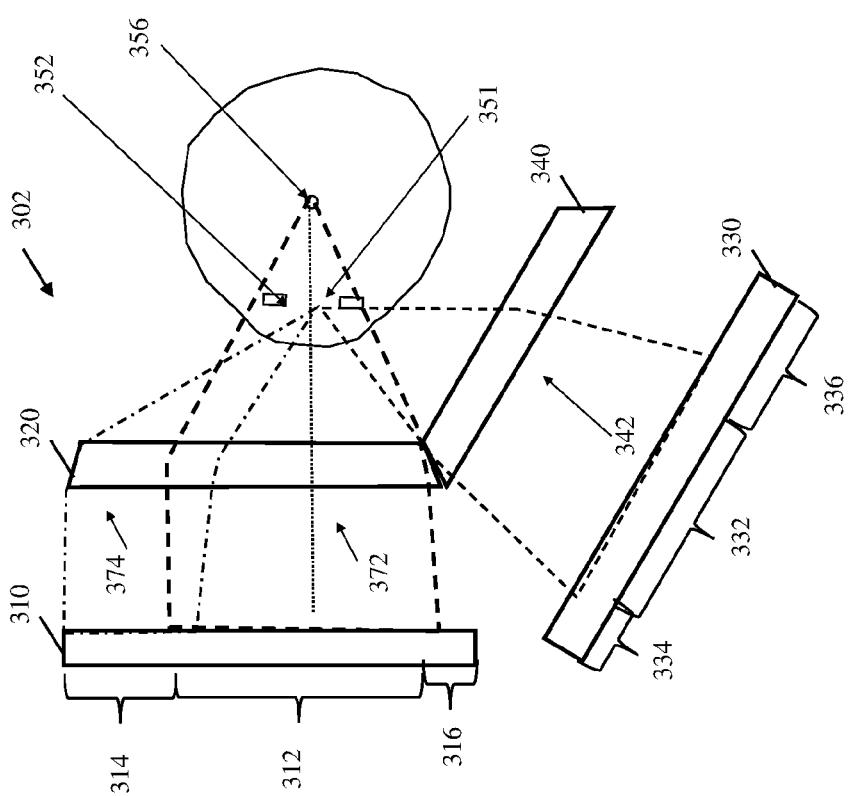
Figure 3D:
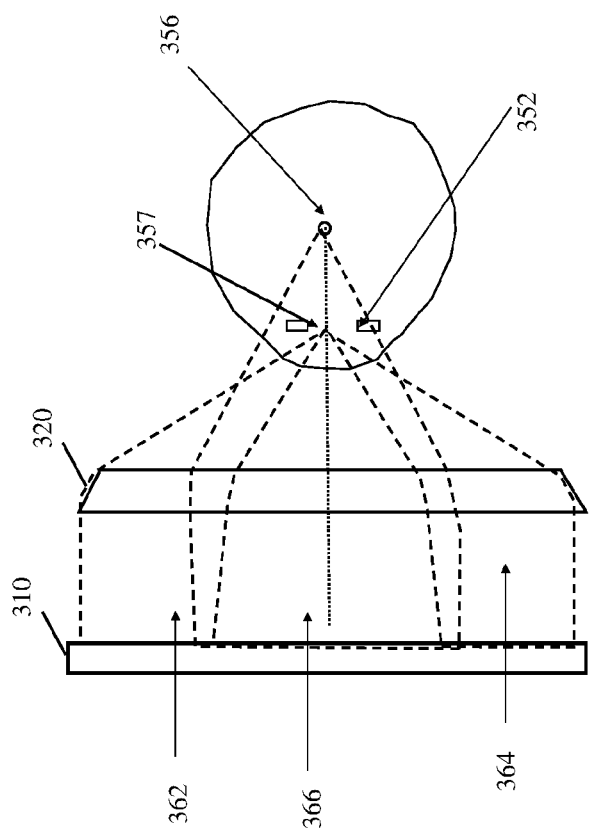
FIG. 3D is a schematic illustration of a side view of a central display and a central lens of the HMD, in accordance with some demonstrative embodiments.
Figure 3C:
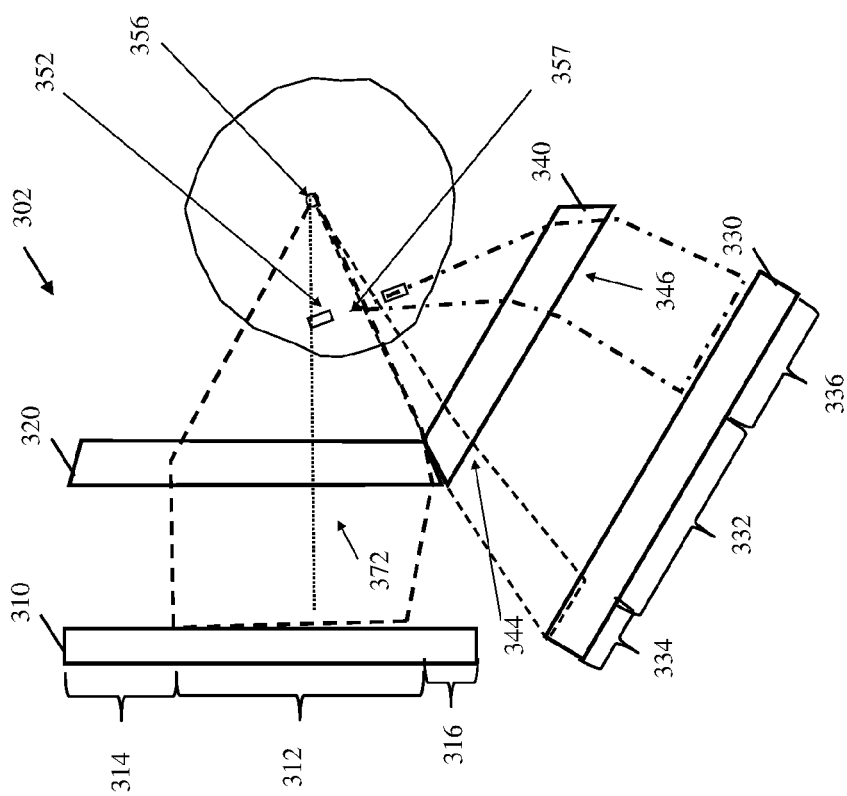

Reference is made to FIGS. 3A-3C, which schematically illustrate a top view of an HMD 302, and to FIG. 3D which schematically illustrates a side view of a central display 310 and a central lens 320 of HMD 302, in accordance with some demonstrative embodiments. For example, HMD 102 (FIG.

1) may include one or more elements of HMD 302, and/or may perform one or more operations of, and/or one or more functionalities of, HMD 302.

In some demonstrative embodiments, as shown in FIGS. 3A-3C, HMD 302 may include a peripheral display 330, and/or a peripheral lens 340, e.g., as described below.

In one example, central lens 320 may be formed, for example, by at least one refractive lens having at least one freeform surface, and/or peripheral lens 320 may be formed, for example, by at least one refractive lens with at least one freeform surface.

In another example, central lens 320 and/or peripheral lens 320 may be formed by any other type of lens, e.g., with a diffractive surface.

In some demonstrative embodiments, as shown in FIG. 3A, a first part 372 of central lens 320, e.g., at the cz lens portion 122 (FIG. 1), may be configured to direct light beams from a first part 312 of central display 310, e.g., of the cz display area 112 (FIG. 1), to a center 356 of eye rotation corresponding to the pupil 352.

In one example, first part 372 may provide central vision optimization, for example, for a rotation, of the pupil 352 to temporal gaze angles and/or to nasal gaze angles.

In some demonstrative embodiments, as shown in FIG. 3A, a second part 374 of central lens 320, e.g., at the cz lens portion 122 (FIG. 1), may be configured to direct light beams from a second part 314 of central display 310, e.g., at the cz display area 112 (FIG. 1), to a point 351, which may be defined based on a position of the pupil 352 at the straight gaze angle, for example, for nasal-peripheral vision optimization of a straight gaze of the pupil 352.

In some demonstrative embodiments, as shown in FIG. B, an xcz lens portion 376 may be configured to direct light beams from an xcz display area 316 to a point 353, which may be defined, for example, based on a position of the pupil 352 at the nasal gaze angle, for example, for temporal-peripheral vision optimization of a rotation of the pupil 352 to nasal gaze angels.

In some demonstrative embodiments, as shown in FIG. 3A, the first part 372 of central lens 320 may be between the xcz lens portion 376 and the second part 374 of central lens 320, e.g., as described below.

In some demonstrative embodiments, as shown in FIG. 3A, a tz lens portion 342 of peripheral lens 340 may be configured to direct light beams from a tz display area 332 to the point 351, which may be defined, for example, based on the position of the pupil 352 at the straight gaze angle.

In one example, tz lens portion 342 may provide temporal-peripheral vision optimization, for example, at the straight gaze.

In some demonstrative embodiments, as shown in FIG. 3C, an xtz lens portion 344 of peripheral lens 340 may be configured to direct light beams from an xtz display area 334 to the center 356 of the eye rotation corresponding to the pupil 352, for example, for vision optimization of central vision at a rotation, e.g., a maximal rotation, of the pupil 352 to the temporal gaze angle.

In some demonstrative embodiments, as shown in FIG. 3C, an xftz lens portion 346 of peripheral lens 340 may be configured to direct light beams from an xftz display area 336 to a point 357, which may be defined, for example, based on a position of the pupil 352 at the temporal gaze angle, for example, for vision optimization of temporal FoV at a rotation, e.g., a maximal rotation, of the pupil 352 to the temporal gaze angle.

In some demonstrative embodiments, as shown in FIG. 3D, a top part 362 and/or a bottom part 364 of the central lens 320 may be configured to direct light beams from the cz display area 312 to the point 357, which may be defined, for example, based on a position of the pupil 352 at the straight gaze angle.

In one example, top part 362 and/or bottom part 364 may provide top and/or bottom-peripheral vision optimization, for example, at the straight gaze, for example, at the bottom and/or top portions of central lens 320.

In some demonstrative embodiments, as shown in FIG. 3D, a middle part 366 of the central lens 320, which may be between the top part 362 and the bottom part 364 of the central lens 320, may be configured to direct light beams from the cz display area 312 to the center 356 of the eye rotation corresponding to the pupil 352.

In one example, middle part 366 may provide central vision optimization, for example, for rotations of the pupil 352, to the upper gaze and/or the bottom gaze.

In some demonstrative embodiments, a refraction of central lens 320 may be configured, for example, according to a merit function defining a plurality of weights, for example, corresponding to a plurality of fields of central display 310, e.g., as described below.

In some demonstrative embodiments, the refraction of central lens 320 may be configured, for example, according to a maximal merit function weight for central fields at rotational gazes, e.g., up to a maximal design choice range, for example, of nasal, temporal, top, and/or bottom angle rotations of pupil 352, such that light may be directed towards center 356 of eye rotation.

In some demonstrative embodiments, the refraction of central lens 320 may be configured, for example, according to a reduced merit function weight for peripheral fields, at straight gazes for nasal, temporal, top, and/or bottom peripheral FoVs, such that light may be directed towards pupil 352 at a straight gazing eye.

In some demonstrative embodiments, central lens 320 may be configured, for example, to provide refraction according to a minimal merit function weight for temporal FoV 376, for example, such that light may be directed towards pupil 352 at a nasal gazing eye.

In some demonstrative embodiments, a refraction of peripheral lens 340 may be configured, for example, according to a merit function defining a plurality of weights, for example, corresponding to a plurality of fields of peripheral display 330, e.g., as described below.

In some demonstrative embodiments, as shown in FIGS. 3A-3C, the refraction of peripheral lens 340 may be configured, for example, according to a maximal merit function weight, for example, for fields 344 starting at a least temporal angle and spreading up to an end of overlap of fields with central lens 320, for example, according to a temporally gazing eye under maximal angle of design choice, for example, such that rays may be aimed towards the pupil 352 at the temporal rotated eye.

In some demonstrative embodiments, as shown in FIGS. 3A-3C, the refraction of peripheral lens 340 may be configured, for example, according to a reduced merit function weight, for example, for peripheral fields 342 of peripheral lens 340 that are less than a temporal angle of 105°, for example, such that rays may be aimed toward pupil 352 at the straight gaze, e.g., and up to a temporal gaze angle of 105.

In some demonstrative embodiments, as shown in FIGS. 3A-3C, the refraction of peripheral lens 340 may be configured, for example, according to a minimal merit function weight, for example, for fields 346 of peripheral lens 340 greater than a temporal angle of 105°, for example, such that rays may be aimed toward pupil 352 at the temporal rotated eye gaze according to an angle of maximal temporal rotation design choice.

Referring back to FIG. 1, in some demonstrative embodiments, an edge 121 of the central lens 120 may be in direct contact with an edge 141 of the peripheral lens 140, e.g., as described below.

In other demonstrative embodiments, the edge 121 of the central lens 120 may not be in contact with edge 141 of the peripheral lens 140, e.g., as described below.

In some demonstrative embodiments, the central lens 120 may be separated from the peripheral lens 140 by a distance of at least 1 mm, e.g., as described below.

In some demonstrative embodiments, the central lens 120 may be separated from the peripheral lens 140 by a distance of at least 1 mm, for example, in a plane connecting optical axes of the central lens 120 and the peripheral lens 140, e.g., as described below.

In some demonstrative embodiments, the central lens 120 may be separated from the peripheral lens 140 by a distance of at least 2 mm, e.g., as described below.

In some demonstrative embodiments, the central lens 120 may be separated from the peripheral lens 140 by a distance of at least 4 mm, e.g., as described below.

In other embodiments, the central lens 120 may be separated from the peripheral lens 140 by any other distance, e.g., as described below.

Figures 4A, 4B, 4C:
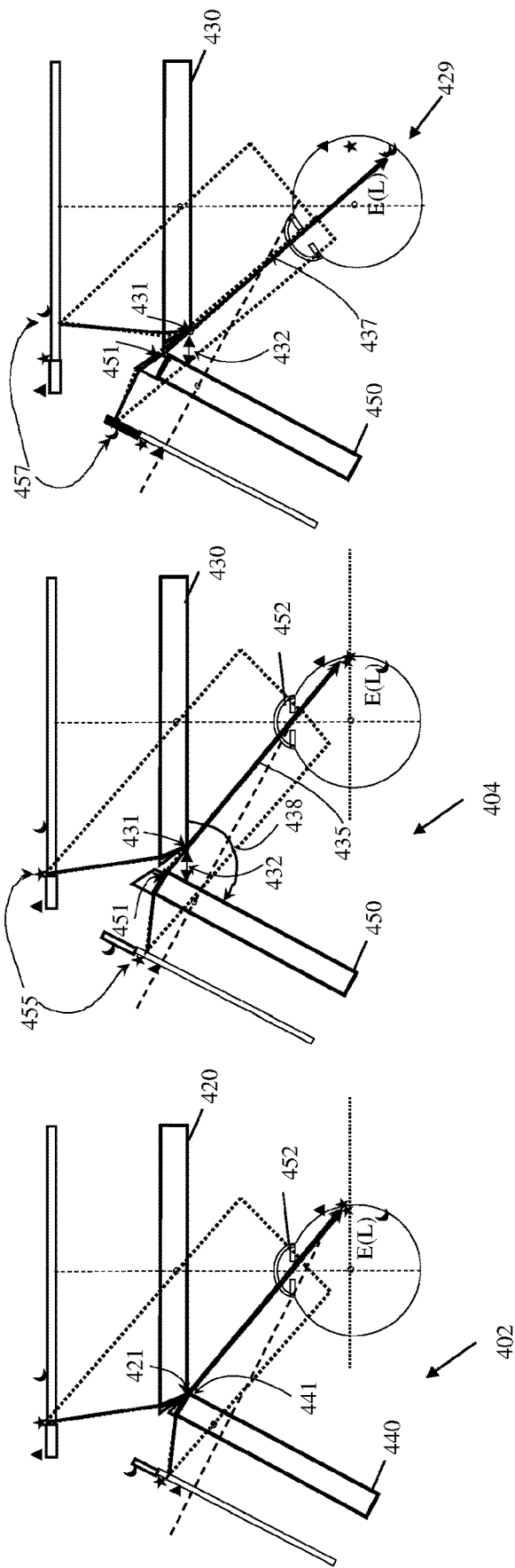
FIG. 4A is a schematic illustration of a first HMD configuration viewed at a straight gaze of a pupil.
FIG. 4B is a schematic illustration of a second HMD configuration viewed at a straight gaze of the pupil.
FIG. 4C is a schematic illustration of the second HMD configuration viewed at a temporal gaze of the pupil, in accordance with some demonstrative embodiments.

Reference is made to FIG. 4A, which schematically illustrates a first HMD configuration 402 viewed at a straight gaze of a pupil 452, to FIG. 4B which schematically illustrates a second HMD configuration 404 viewed at a straight gaze of pupil 452, and to FIG. 4C which schematically illustrates the second HMD configuration 404 viewed at a temporal gaze of pupil 452, in accordance with some demonstrative embodiments. For example, HMD 102 (FIG. 1) may include one or more elements of HMD configuration 402, and/or may perform one or more operations of, and/or one or more functionalities of, HMD configuration 402; and/or HMD 102 (FIG. 1) may include one or more elements of HMD configuration 404, and/or may perform one or more operations of, and/or one or more functionalities of, HMD configuration 404.

In some demonstrative embodiments, as shown in FIG. 4A, an edge 421 of a central lens 420 of HMD 402 may be in direct contact with an edge 441 of a peripheral lens 440 of HMD 402.

In some demonstrative embodiments, as shown in FIG. 4B and FIG. 4C, an edge 431 of a central lens 430 of HMD 404 may not be in direct contact with an edge 451 of a peripheral lens 450 of HMD 404, e.g., as described below.

In some demonstrative embodiments, as shown in FIG. 4B and FIG. 4C, the central lens 430 may be separated from the peripheral lens 450 by a distance 432.

In some demonstrative embodiments, the central lens 430 may be separated from the peripheral lens 450, for example, in a plane connecting optical axes of the central lens 430 and the peripheral lens 450, e.g., as described below.

In some demonstrative embodiments, the distance 432 may be at least 1 mm. In other embodiments, the distance 432 may include any other distance.

In some demonstrative embodiments, as shown in FIG. 4B, HMD 404 may provide a continuous FoV, for example, at the straight gaze, for example, even when the central lens 430 is separated from the peripheral lens 450, e.g., as described below.

In some demonstrative embodiments, as shown in FIG. 4B, a temporal FoV and a central FoV may direct light from a same point 455 of the image scene, e.g., the black star, and rays directed from point 455 at the central lens 430 and at the peripheral lens 450 may be collimated to form a single chief ray 435, which may be focused by the eye toward a same point on the retina of the eye. Therefore, the objects at point 455, e.g., the black stars, may be perceived as a single object by the eye/brain.

In some demonstrative embodiments, as shown in FIG. 4C, HMD 404 may provide a continuous FoV, for example, at the peripheral gaze, for example, even when the central lens 430 is separated from the peripheral lens 450, e.g., as described below.

In some demonstrative embodiments, as shown in FIG. 4C, a temporal FoV and a central FoV may cover a same point 457, e.g., the black moon, and rays directed from point 457 at the central lens 430 and at the peripheral lens 450 may be collimated to form a single chief ray 437, which may be focused by the eye toward a same point on the retina of the eye. Therefore, the objects at point 457, e.g., the black moons, may be perceived as a single object by the eye/brain.

In some demonstrative embodiments, as shown in FIG. 4B and in FIG. 4C, the rays from overlapping objects, e.g., the black moon and/or the black triangle, may be joined at a virtual joint point, which may sustain the continuous FoV. This may be compared to HMD 402, which includes a physical joint point, e.g., the direct contact between edges 441 and 421.

In some demonstrative embodiments, using the virtual joint point, e.g., when the central lens 430 and the peripheral lens 450 are separated, may support a curved back surface of the central lens 430 and/or the peripheral lens 450, and/or may support adjusting of a tilt angle 438 between the central lens 430 and the peripheral lens 450, for example, when the central lens 430 and/or the peripheral lens 450 are curved.

In some demonstrative embodiments, using the virtual joint point, e.g., when the central lens 430 and the peripheral lens 450 are separated, may support moving of the peripheral lens 450, e.g., in a temporal direction, by distance 432, for example, to allow temples of eye glasses to mechanically fit inside HMD device 404, for example, when the user of the HMD device wears eyeglasses.

In some demonstrative embodiments, content on peripheral display 430 may be adjusted, for example, to maintain proportions of object dimensions, and/or to maintain overlap points 455 and/or 457, for example, based on an increase in a distance between the eye and peripheral display 430.

Referring back to FIG. 1, in some demonstrative embodiments, HMD device 100 may include a controller 150 configured to cause the central display 110 to display the first image, for example, based on image information of the image scene, and/or to cause the peripheral display 130 to display the second image, for example, based on the image information of the image scene, e.g., as described below.

In one example, at least part of the functionality of controller 150 may be implemented by an integrated circuit, for example, a chip, e.g., a System on Chip (SoC). In some demonstrative embodiments, controller 150 may include, or may be implemented, partially or entirely, by circuitry and/or logic, e.g., one or more processors including circuitry and/or logic, and/or memory circuitry and/or logic. Additionally or alternatively, one or more functionalities of controller 150 may be implemented by logic, which may be executed by a machine and/or one or more processors, e.g., as described below.

In other embodiments, controller 150 may be implemented by any other logic and/or circuitry, and/or according to any other architecture.

In one example, controller 150 may include at least one memory 158, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 150 may be based on any computer architecture, which may support rendering graphical information to be displayed by central display 110 and/or peripheral display 130.

In some demonstrative embodiments, HMD device 100 may include a tilt angle adjuster 155 configured to adjust the tilt angle 127 of the peripheral lens 140 relative to the central lens 120, e.g., as described below.

In some demonstrative embodiments, tilt angle adjuster 155 may be configured to adjust, e.g., commonly adjust with tilt angle 127, a tilt angle of the peripheral lens 175 relative to the central lens 165, e.g., as described below.

In other embodiments, HMD device 100 may include a first tilt angle adjuster configured to adjust the tilt angle 127 of the peripheral lens 140 relative to the central lens 120, and a second tilt angle adjuster configured to adjust the tilt angle of the peripheral lens 175 relative to the central lens 165.

In some demonstrative embodiments, tilt angle adjuster 150 may include a mechanical tilt adjuster, an electromechanical tilt adjuster, and/or any other type of tilt angle adjuster.

In some demonstrative embodiments, a user of HMD device 100 may utilize tilt angle adjuster 155 to adjust the tilt angle 127.

In some demonstrative embodiments, controller 150 may be configured to control tilt angle adjuster 155 to adjust the tilt angle 127.

In some demonstrative embodiments, tilt angle 127 may be adjusted, for example, according to an Eye Relief (ER) setting of the eye of the user, e.g., as described below.

In some demonstrative embodiments, the eye relief setting may define a distance between the pupil 152 of the eye of the user and the central lens 120, e.g., as described below.

In one example, the user of HMD device 100 may control tilt angle adjuster 155 to adjust the tilt angle 127, for example, based on the eye relief setting.

In another example, HMD device 100 may be manufactured to include a preconfigured or adjustable setting of tilt angle 127, for example, according to a predefined eye-relief setting. For example, a plurality of types or sizes of HMD device 100 may be manufactured with different tilt angles corresponding to a plurality of different eye-relief settings.

In some demonstrative embodiments, controller 150 may be configured to control tilt angle adjuster 155 to adjust the tilt angle 127, for example, based on the eye relief setting, e.g., as described below.

In some demonstrative embodiments, HMD device 100 may include an ER estimator, configured to estimate the eye relief setting, and to provide the eye relief setting to controller 150.

Figure 5:
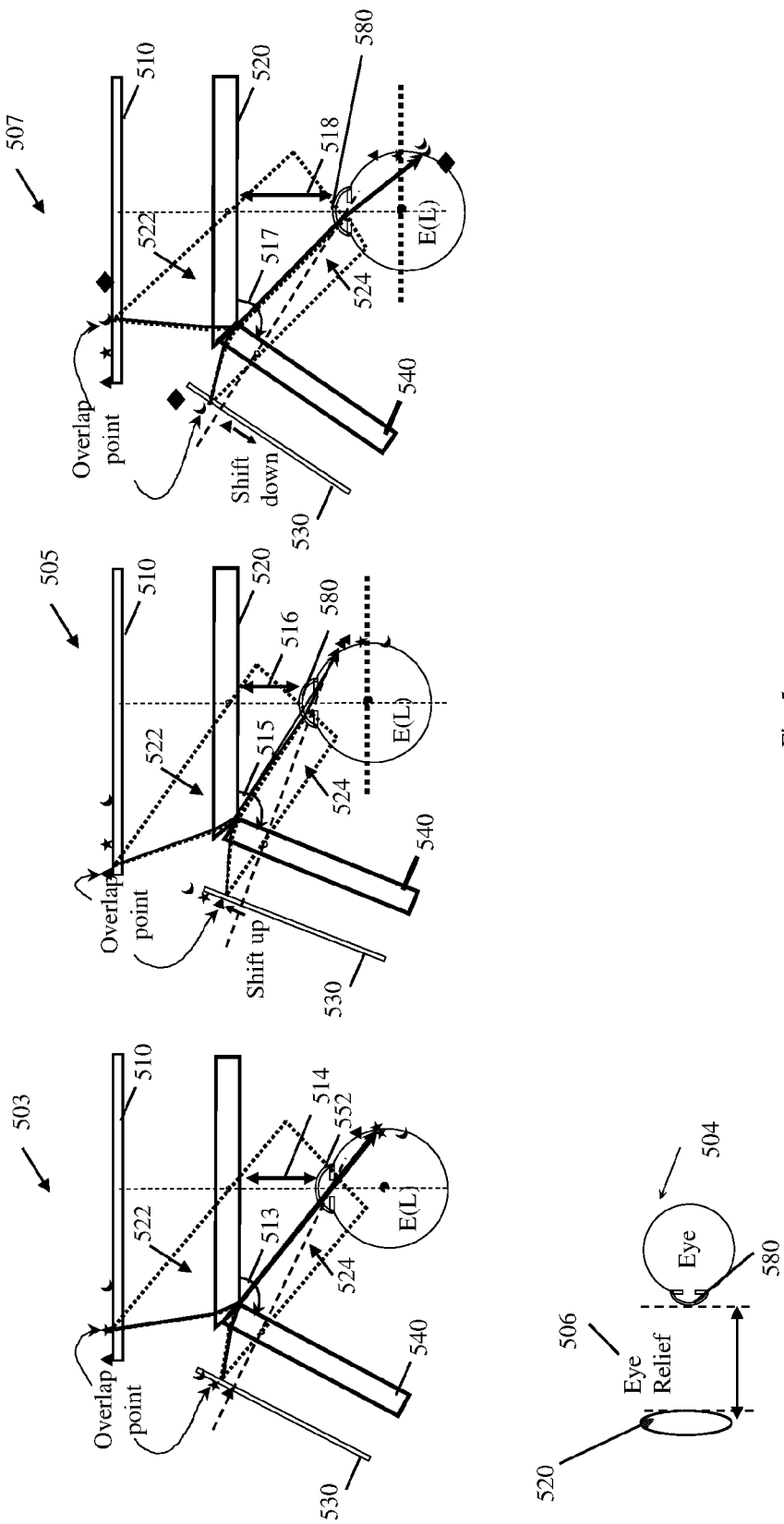
FIG. 5 is a schematic illustration of a first HMD configuration, a second HMD configuration, and a third HMD configuration, in accordance with some demonstrative embodiments.

Reference is made to FIG. 5, which schematically illustrates a first HMD configuration 503, a second HMD configuration 505, and a third HMD configuration 507, in accordance with some demonstrative embodiments. For example, HMD 102 (FIG. 1) may include one or more elements of HMD configurations 503, 505 and/or 507, and/or may perform one or more operations of, and/or one or more functionalities of, HMD 503, 505 and/or 507.

In some demonstrative embodiments, as shown in FIG. 5, HMD configurations 503, 505 and/or 507 may include a central display 510, a central lens 520, a peripheral display 530, and a peripheral lens 540, e.g., as described below.

In some demonstrative embodiments, as shown in FIG. 5, an eye-relief setting 504 may correspond to a distance 506 between a cornea 580 of an eye of a user and central lens 520.

In some demonstrative embodiments, as shown in FIG. 5, first configuration 503 may have a first tilt angle 513 of peripheral lens 540 relative to central lens 520.

In some demonstrative embodiments, as shown in FIG. 5, tilt angle 513 may correspond to a first eye-relief setting corresponding to a first distance 514, e.g., the distance 506, between central lens 520 and cornea 580.

In one example, the first eye-relief setting and tilt angle 513 may be configured for a predefined ER setting. For example, the predefined ER setting may be predetermined, for example, based on an ER measurement function.

In some demonstrative embodiments, as shown in FIG. 5, tilt angle 513 may be configured to provide a continuous FoV for the first eye-relief setting. For example, a light beam originated by the black star from central FoV 522, and a light beam originated by the black star from temporal FoV 524 may coincide at an overlapped point.

In some demonstrative embodiments, as shown in FIG. 5, second configuration 505 may have a second tilt angle 515 of peripheral lens 540 relative to central lens 520.

In some demonstrative embodiments, as shown in FIG. 5, tilt angle 515 may correspond to a second eye-relief setting corresponding to a second distance 516 between central lens 520 and cornea 580.

In one example, the second eye-relief setting and tilt angle 515 may correspond to a minimal distance, e.g., distance 516, between central lens 520 and the cornea 580, and a minimal tilt angle of peripheral lens 540 relative to central lens 520, respectively.

In one example, nasal and temporal overlap zones may be adjusted correspondingly, for example, such that the temporal overlap field may be shifted up, e.g., towards the central zone.

In some demonstrative embodiments, as shown in FIG. 5, tilt angle 515 may be configured to provide a continuous FoV for eye-relief setting 516. For example, the light beam originated by the black triangle from central FoV 522 and the light beam originated by the black triangle from temporal FoV 524 may both coincide at an overlapped point.

In some demonstrative embodiments, as shown in FIG. 5, third configuration 507 may have a third tilt angle 517 of peripheral lens 540 relative to central lens 520.

In some demonstrative embodiments, as shown in FIG. 5, tilt angle 517 may correspond to a third eye-relief setting corresponding to a third distance 518 between central lens 520 and a cornea 580.

In one example, the third eye-relief setting and tilt angle 517 may correspond to a maximal distance, e.g., distance 518, between central lens 520 and the pupil 552, and a maximal tilt angle of peripheral lens 540 relative to central lens 520, respectively.

In one example, the maximal distance may provide an improved user experience, for example, for a user wearing eyeglasses.

In another example, the nasal and temporal overlap zones may be adjusted correspondingly, for example, such that the temporal overlap field may be shifted down, e.g., towards the temporal zone.

In some demonstrative embodiments, as shown in FIG. 5, tilt angle 517 may be configured to provide a continuous FoV for eye-relief setting 518. For example, the light beam originated by the black moon from central FoV 522 and the light beam originated by the black moon from temporal FoV 524 may both coincide at an overlapped point.

In one example, adjusting tilt angle 513 based on the ER setting 504 may support maintaining a continuous FoV. For example, when the distance 506 is out of a working ER range, the temporal FoV 524 may deteriorate, and/or parts of the temporal FoV may be unseen or deteriorated.

In one example, ER setting for an HMD, e.g., HMD device 100 (FIG. 1), may be different for different users, for example, as there may be diversity in anatomies of a human face. According to this example, controller 150 (FIG. 1) and/or tilt angle adjuster 155 (FIG. 1) may allow the user to adjust the ER setting to an optimal distance, for example, based on mechanics and/or image processing techniques.

Referring back to FIG. 1, in some demonstrative embodiments, controller 150 may be configured to dynamically adjust the tilt angle 127 of the peripheral lens 140 relative to the central lens 120, for example, based on the gaze angle of the pupil 152, e.g., as described below.

In some demonstrative embodiments, controller 150 may be configured to monitor a gaze angle of the pupil 152, e.g., as described below.

In one example, HMD device 100 may include a gaze tracker configured to track the gaze angle of the pupil 152. For example, the gaze tracker 159 may include a camera, and/or any other gaze tracking mechanism.

In another example, the gaze angle of the pupil 152 may be predicted and/or assumed, for example, based on the image scene. For example, if the image scene includes an explosion to be displayed on the peripheral display 130, a temporal gaze towards the explosion may be expected.

In some demonstrative embodiments, controller 150 may be configured to identify a tilt setting of the tilt angle 127 of the peripheral lens 140 relative to the central lens 120, e.g., as described below.

In some demonstrative embodiments, controller 150 may be configured to determine a portion of the image scene to be displayed by the peripheral display 130, for example, based on the tilt setting, e.g., as described below.

Figure 6B:
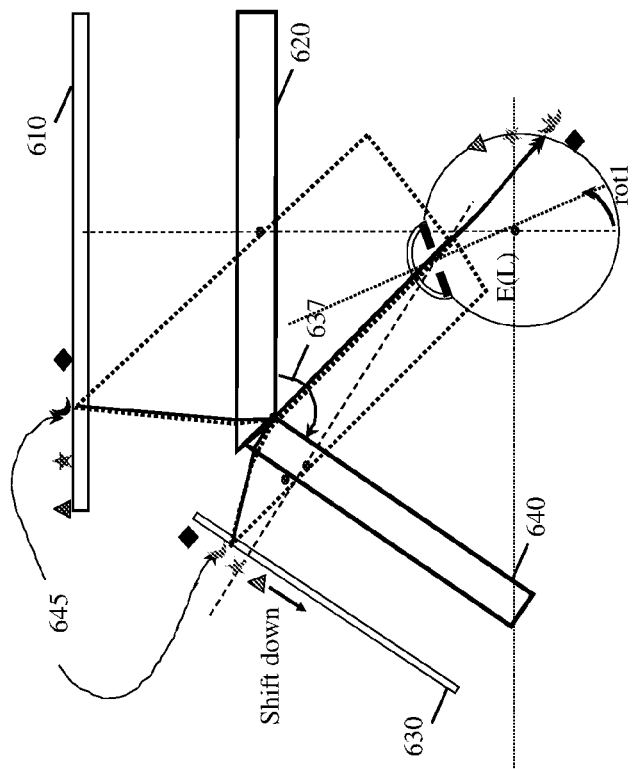
FIG. 6B is a schematic illustration of a second HMD configuration viewed at a temporal gaze of the pupil, in accordance with some demonstrative embodiments.
Figure 6A:
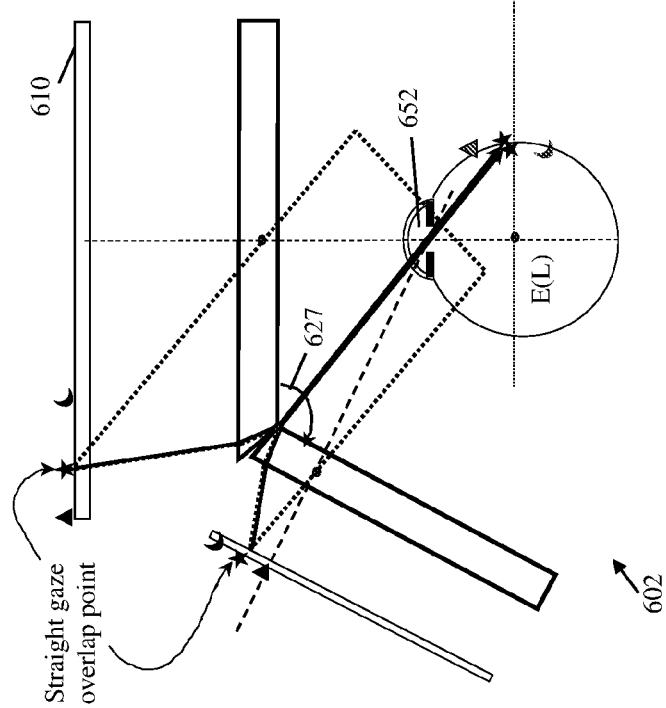
FIG. 6A is a schematic illustration of a first HMD configuration viewed at a straight gaze of a pupil.

Reference is made to FIG. 6A, which schematically illustrates an HMD configuration 602 viewed at a straight gaze of a pupil 652, and to FIG. 6B which schematically illustrates the HMD configuration 602 viewed at a temporal gaze of the pupil 652, in accordance with some demonstrative embodiments. For example, HMD 102 (FIG. 1) may include one or more elements of HMD configuration 602, and/or may perform one or more operations of, and/or one or more functionalities of, HMD configuration 602.

In some demonstrative embodiments, as shown in FIGS. 6A and 6B, there may be a first tilt angle 627 of a peripheral lens 640 relative to a central lens 620 of HMD 602, for example, when pupil 652 is at the straight gaze. The first tilt angle 627 may be different from a second tilt angle 637 of the peripheral lens 640 relative to the central lens 620 of HMD 602, for example, when pupil 652 is at the temporal gaze.

In some demonstrative embodiments, as shown in FIG. 6B, the tilt angle 637 may be configured to maintain a continuous FoV at the temporal gaze of the pupil 652.

In some demonstrative embodiments, as shown in FIG. 6B, the tilt angle 637 may be configured to maintain a continuous FoV at the temporal gaze, for example, such that there may be an overlap, e.g., at an overlap point 645, e.g., including the black moon, between the central display 610 and the peripheral display 630.

In one example, tilt angle 637 may be adjusted for optimal refraction of rays aiming eye pupil 652 and reaching a macular zone of a retina, for example, at the temporal eye gaze.

In some demonstrative embodiments, controller 150 (FIG. 1) may be configured to determine a portion of the image scene to be displayed by the peripheral display 630, for example, based on the tilt setting of the tilt angle 637, e.g., as described below.

In some demonstrative embodiments, controller 150 (FIG. 1) may be configured to distribute content of the image scene on central display 610 and peripheral display, for example, to maintain a continuous image, for example, based on the adjustment of tilt angle 637.

In one example, when pupil 652 has a strong rotation to the peripheral display 630, the tilt angle 627 may be adjusted, e.g., dynamically adjusted, for example, together with content distribution, e.g., shifting down the content, on peripheral display 630, for example, such that a first chief ray, e.g., from the black moon on central display 610 as refracted via central lens 620, may be collinear with a second chief ray, e.g., from the black moon on the peripheral display 630 as refracted via peripheral lens 640. For example, this collinearity of the first and second chief rays may provide an optimal refraction through peripheral lens 640 toward the pupil, which may sustain a high Visual Acuity (VA) of the peripheral display 630 at the temporal gaze.

Referring back to FIG. 1, in some demonstrative embodiments, controller 150 may be configured to apply one or more pre-distortions to the image scene to be displayed by the central display 110 and/or the peripheral display 130, e.g., as described below.

In some demonstrative embodiments, controller 150 may be configured to apply a trapezoidal pre-distortion to a portion of the image scene to be displayed by the central display 110, and/or to apply a trapezoidal pre-distortion to a portion of the image scene to be displayed by the peripheral display 130, e.g., as described below.

In some demonstrative embodiments, controller 150 may configure a pre-distortion to be applied to a portion of the image scene to be displayed by the central display 110, for example, based on the eye-relief setting, the tilt angle of the HMD device 100, and/or an interpupillary distance (IPD) of the user, e.g., as described below.

In some demonstrative embodiments, controller 150 may configure a pre-distortion to be applied to a portion of the image scene to be displayed by the peripheral display 130, for example, based on the eye-relief setting, the tilt angle of the HMD device 100, and/or the IPD of the user, e.g., as described below.

In some demonstrative embodiments, controller 150 may be configured to apply one or more pre-distortions to the image scene to be displayed by the central display 110 and/or the peripheral display 130, for example, based on identification of a gaze direction of the pupil 152, e.g., as described below.

In one example, controller 150 may identify the gaze direction, for example, based on an input from the gaze identifier 159, a prediction, and/or any other method, e.g., as described above.

In some demonstrative embodiments, controller 150 may be configured to, based on identification of the temporal gaze of the pupil 152, generate the first image by applying a trapezoidal pre-distortion to a portion of the image scene, e.g., to one or more objects, to be displayed by the central display 110, e.g., as described below.

In other embodiments, controller 150 may be configured to apply any other additional or alternative pre-distortion to the portion of the image scene to be displayed by the central display 110. For example, controller 150 may be configured to apply barrel, pincushion, mixed, and/or chromatic pre-aberration distortions to the portion of the image scene to be displayed by the central display 110

In some demonstrative embodiments, controller 150 may be configured to, based on identification of the straight gaze of the pupil 152, generate the second image by applying a first trapezoidal pre-distortion to a portion of the image scene to be displayed by the peripheral display 130, e.g., as described below.

In some demonstrative embodiments, controller 150 may be configured to, based on identification of a non-straight gaze of the pupil 152, generate the second image, for example, by applying a second trapezoidal pre-distortion to the portion of the image scene to be displayed by the peripheral display 130, e.g., as described below.

In some demonstrative embodiments, the second trapezoidal pre-distortion may be different from the first trapezoidal pre-distortion, e.g., as described below.

In some demonstrative embodiments, controller 150 may be configured to determine the second trapezoidal pre-distortion to be less than the first trapezoidal pre-distortion, for example, based on identification of the temporal gaze of the pupil 152, e.g., as described below.

In some demonstrative embodiments, controller 150 may be configured to determine the second trapezoidal pre-distortion to be greater than the first trapezoidal pre-distortion, for example, based on identification of the nasal gaze of the pupil 152, e.g., as described below.

In other embodiments, controller 150 may be configured to apply any other additional or alternative pre-distortion to the portion of the image scene to be displayed by the peripheral display 130. For example, controller 150 may be configured to apply barrel, pincushion, mixed, and/or chromatic pre-aberration distortions to the portion of the image scene to be displayed by the peripheral display 130.

Figure 7:
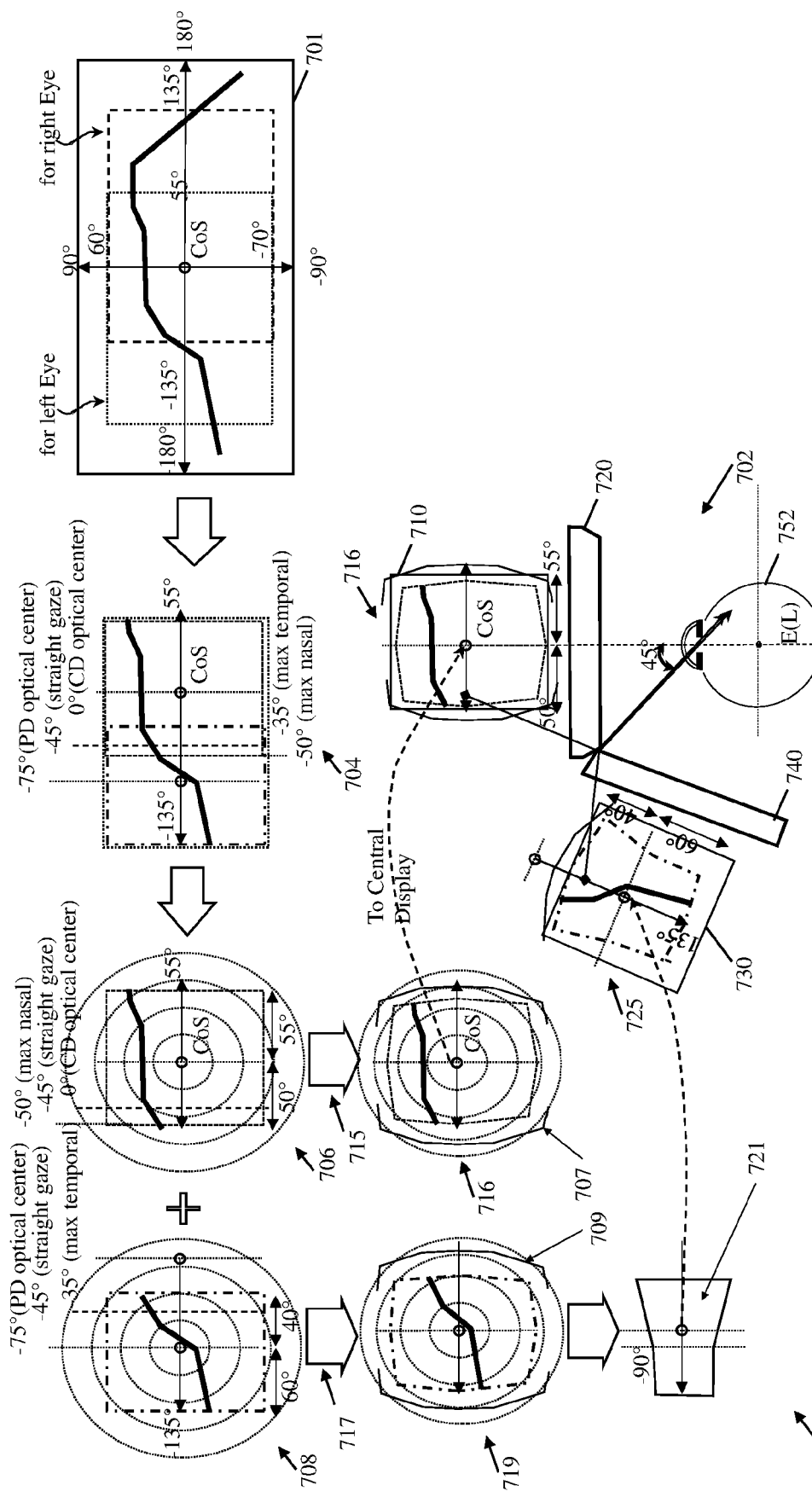
FIG. 7 is a schematic illustration of a pre-distortion scheme to distort an image scene to be displayed by an HMD, in accordance with some demonstrative embodiments.

Reference is made to FIG. 7, which schematically illustrates a pre-distortion scheme 700 to distort an image scene 701 to be displayed by an HMD 702. For example, HMD 102 (FIG. 1) may include one or more elements of HMD 702, and/or may perform one or more operations of, and/or one or more functionalities of, HMD 702.

In some demonstrative embodiments, as shown in FIG. 7, HMD 702 may include a central display 710, a central lens 720, a peripheral display 730, and a peripheral lens 740, e.g., as described below.

In some demonstrative embodiments, as shown in FIG. 7, image scene 701 may be displayed to a right eye and a left eye of a user, for example, to cover a continuous FoV of 270 degrees, e.g., 135° for the left eye from a Center of Scene (CoS) to a maximal temporal gaze for the left eye, and 135° for right eye from the CoS to a maximal temporal gaze for the right eye.

In one example, image scene 701 may include a stereoscopic image scene.

In another example, image scene 701 may include a three dimensional (3D) image scene, for example, generated from different perspectives for left and right eyes.

In another example, image scene 701 may be extracted from a 360-degree image scene, e.g., based on 360-degree visual information. For example, the image scene 701 may be based on head orientation and/or spatial location, e.g., using any suitable Inertial Motion Unit (IMU) and/or Inside-Out or Outside-In tracking.

In some demonstrative embodiments, as shown in FIG. 7, controller 150 (FIG. 1), may be configured to crop the image scene 701 into a first image scene 704 for the left eye 752, and a second image scene for the right eye.

In one example, controller 150 (FIG. 1) may set a CoS of central display 710, for example, assuming a given eye relief and a tilt angle of HMD 702, a straight gaze, a fit of central display 710 in front of eye 752 such that a visual axis of the eye 752 may be collinear with the optical axis of the central lens 710, and/or a given eyes convergence distance, e.g., making deviation from visual axis.

In some demonstrative embodiments, controller 150 (FIG. 1) may set a PD optical center of peripheral display 730, e.g., at −75 degrees, which may correspond to the CoS, for example, with angular offset according to opto-mechanical design and the given eyes convergence distance.

In some demonstrative embodiments, controller 150 (FIG. 1) may compensate the content of central display 710, for example, to present realistic images, for example, to fix geometrical distortions and chromatic aberrations created by central lens 720 according to the CoS.

In some demonstrative embodiments, as shown in FIG. 7, controller 150 (FIG. 1), may be configured to crop the image scene 704 for the left eye into a first image 706 to be displayed on central display 710, and into a second image 708 to be displayed on peripheral display 730.

In some demonstrative embodiments, controller 150 (FIG. 1) may be configured to generate first image 706 and/or second image 708, for example, such that a color gamut equalization may be maintained between central display 710 and peripheral display 730.

In one example, controller 150 (FIG. 1) may be configured to dynamically calibrate a color gamut of the first image 706 and/or a color gamut of the second image 708, for example, to maintain the color gamut equalization between central display 710 and peripheral display 720. For example, controller 150 (FIG. 1) may be configured to dynamically calibrate the color gamut of the first image 706 and/or the color gamut of the second image 708 based on a tilt angle between central lens 720 and peripheral lens 740, based on an ER setting of HMD 702, based on an IPD of the user, and/or based on a tilt setting of HMD 702. For example, controller 150 (FIG. 1) may be configured to dynamically calibrate the color gamut of first image 706 and/or second image 708, for example, by considering one or more spectral effects via central lens 720, and/or one or more spectral effects via peripheral lens 740.

In some demonstrative embodiments, controller 150 (FIG. 1) may be configured to dynamically calibrate the color gamut of the first image 706 and/or the color gamut of the second image 708 based on any other additional or alternative parameters and/or criteria.

In some demonstrative embodiments, controller 150 (FIG. 1) may be configured to generate first image 706 and/or second image 708, for example, such that a spatial light intensity equalization may be maintained between central display 710 and peripheral display 730.

In one example, controller 150 (FIG. 1) may be configured to dynamically calibrate the spatial light intensity of the first image 706 and/or the spatial light intensity of the second image 708, for example, to maintain equalization between central display 710 and peripheral display 720. For example, controller 150 (FIG. 1) may be configured to dynamically calibrate the spatial light intensity of the first image 706 and/or the spatial light intensity of the second image 708 based on a tilt angle between central lens 720 and peripheral lens 740, based on an ER setting of HMD 702, based on an IPD of the user, and/or based on a tilt setting of HMD 702. For example, controller 150 (FIG. 1) may be configured to dynamically calibrate the spatial light intensity of the first image 706 and/or of the second image 706, for example, by considering non-uniform light absorption and/or scattering via central lens 720 and/or peripheral lens 740, e.g., as a function of distance from an optical axis of central lens 720 and/or peripheral lens 740.

In one example, controller 150 (FIG. 1) may be configured to dynamically calibrate the spatial light intensity of the first image 706 and/or the spatial light intensity of the second image 708, for example, to maintain equalization between central display 710 and peripheral display 720, for example, to compensate light absorptions and/or scattering from some regions of the lenses, e.g., for Fresnel facets, and/or to equalize intensities coming from central display 710 and/or peripheral display 730, e.g., in a fusion region between central display 710 and peripheral display 730, for example, for maintaining a seamless image.

In some demonstrative embodiments, controller 150 (FIG. 1) may be configured to dynamically calibrate the spatial light intensity of the first image 706 and/or the spatial light intensity of the second image 708 based on any other additional or alternative parameters and/or criteria.

In some demonstrative embodiments, as shown in FIG. 7, controller 150 (FIG. 1) may be configured to apply a pre-distortion 715 to the image 706 to generate a pre-distorted image 716.

In some demonstrative embodiments, as shown in FIG. 7, pre-distorted image 716 may include an additional margin 707, for example, to fill central display 710, e.g., after a barrel pre-distortion.

In some demonstrative embodiments, as shown in FIG. 7, controller 150 (FIG. 1) may be configured to display pre-distorted image 716 on central display 710.

In some demonstrative embodiments, as shown in FIG. 7, controller 150 (FIG. 1) may be configured to apply a pre-distortion 717 to the image 708 to generate a pre-distorted image 719.

In some demonstrative embodiments, as shown in FIG. 7, pre-distorted image 719 may include an additional margin 709, for example, to fill peripheral display 730, e.g., after a barrel pre-distortion.

In some demonstrative embodiments, the content of peripheral display 730 may be pre-distorted according to one or more geometrical pre-distortions, e.g., barrel, keystone, and/or the like, and/or chromatic pre-aberrations relatively to peripheral display 730, for example, in order to present realistic images and/or a continuous FoV.

In one example, for a given eye relief setting and a correct inter pupillary distance (IPD) such that central display 710 optical axis is aligned with a visual axis of a straight gazing eye 752, there may be one or more pre-distortions to compensate distortions for the central display 710 and peripheral display 730, for example, before overlap generation. The one or more pre-distortions may include geometrical pre-distortions and/or chromatic aberrations of central lens 710 and/or peripheral lens 730.

In one example, the pre-distortions may be performed separately for each pixel sub-color channel, e.g., separate for Red, Green and/or Blue (RGB) subpixels. For example, in such a way, the chromatic aberrations may be compensated without a separate procedure.

In some demonstrative embodiments, controller 150 (FIG. 1) may be configured to apply a trapezoidal pre-distortion 721 to the pre-distorted image 719, for example, based on a gaze of the eye 752.

In some demonstrative embodiments, controller 150 (FIG. 1) may be configured to apply the trapezoidal pre-distortion 721 to image 719, for example, when identifying a temporal gaze of the eye 752.

In one example, a pre-distortion, e.g., a keystone/trapezoidal pre-distortion, may be reduced on peripheral display 730 and may be introduced on central display 710, for example, when the eye 752 moves temporally between central display 710 and peripheral display 730. In some demonstrative embodiments, controller 150 (FIG. 1) may be configured to generate a trapezoidal distorted image 725, for example, by applying the trapezoidal pre-distortion 721 to the pre-distorted image 719.

In some demonstrative embodiments, controller 150 (FIG. 1) may display the trapezoidal distorted image 725 on peripheral display 730.

In some demonstrative embodiments, controller 150 (FIG. 1) may be configured to generate and/or update trapezoidal distorted image 725, for example, based on the gaze of the eye 752.

In one example, controller 150 (FIG. 1) may generate a first trapezoidal distorted image, for example, when identifying a straight gaze of the eye 752.

In another example, controller 150 (FIG. 1) may generate a second trapezoidal distorted image, for example, when identifying a peripheral gaze of the eye 752. For example, a trapezoidal pre-distortion of the second trapezoidal distorted image may be less than a trapezoidal pre-distortion of the first trapezoidal distorted image.

In another example, controller 150 (FIG. 1) may generate a third trapezoidal distorted image, for example, when identifying a nasal gaze of the eye 752. For example, a trapezoidal pre-distortion of the third trapezoidal distorted image may be greater than a trapezoidal pre-distortion of the first trapezoidal distorted images.

In one example, the trapezoidal pre-distortion at peripheral display 730 may be reduced and up to neutralized, for example, at the temporal gaze, for example, based on a gaze amplitude toward a temporal direction. According to this example, the trapezoidal pre-distortion may be introduced on the central display 710, for example, at the temporal gaze.

In some demonstrative embodiments, controller 150 may be configured to apply a trapezoidal pre-distortion to image 706 to be displayed by the central display 710, and/or a trapezoidal pre-distortion to image 708 to be displayed by the peripheral display 730, for example, based on an eye-relief setting of HMD 702, a tilt angle of HMD 702 with respect to the head of the user, and/or the IPD of the user.

In other embodiments, controller 150 may be configured to apply a trapezoidal pre-distortion to image 706 to be displayed by the central display 710, and/or a trapezoidal pre-distortion to image 708 to be displayed by the peripheral display 730 based on any other additional or alternative parameter and/or criteria.

Referring back to FIG. 1, in some demonstrative embodiments, controller 150 may be configured to cause the central display 110 to display the cz portion of the first image including a first duplicated portion of the image scene, e.g., as described below.

In some demonstrative embodiments, controller 150 may be configured to cause the central display 110 to display the xcz portion of the first image including a second duplicated portion of the image scene, e.g., as described below.

In some demonstrative embodiments, controller 150 may be configured to cause the peripheral display 130 to display the tz portion of the second image including the second duplicated portion of the image scene, e.g., as described below.

In some demonstrative embodiments, controller 150 may be configured to cause the peripheral display 130 to display the xtz portion of the second image including the first duplicated portion of the image scene, e.g., as described below.

In some demonstrative embodiments, the first duplicated portion of the image scene may cover a FoV of at least 5 degrees, e.g., as described below.

In other embodiments, the first duplicated portion of the image scene may cover any other FoV, e.g., as described below.

In some demonstrative embodiments, the second duplicated portion of the image scene may cover a FoV of at least 5 degrees, e.g., as described below.

In other embodiments, the second duplicated portion of the image scene may cover any other FoV, e.g., as described below.

Figure 8:
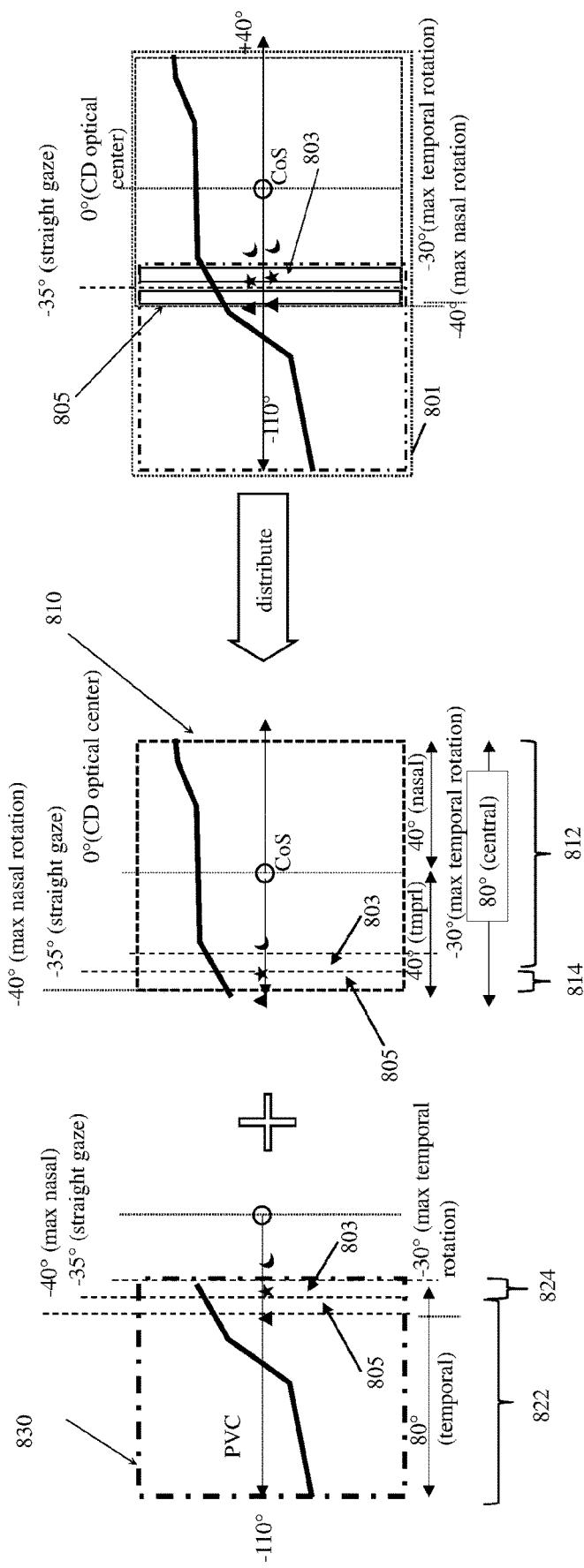
FIG. 8 is a schematic illustration of a distribution scheme to distribute an image scene to be displayed by a central display and a peripheral display of an HMD, in accordance with some demonstrative embodiments.

Reference is made to FIG. 8, which schematically illustrates a distribution scheme to distribute an image scene 801 to be displayed by a central display 810 and a peripheral display 830 of an HMD. For example, HMD 102 (FIG. 1) may include central display 810 and peripheral display 830.

In some demonstrative embodiments, controller 150 (FIG. 1) may be configured to distribute image scene 801 to central display 810 and peripheral display 830.

In some demonstrative embodiments, as shown in FIG. 8, image scene 801 may include a first duplicated portion 803 of the image scene 801.

In some demonstrative embodiments, as shown in FIG. 8, image scene 801 may include a second duplicated portion 805 of the image scene 801.

In some demonstrative embodiments, as shown in FIG. 8, controller 150 (FIG. 1) may be configured to cause the central display 810 to display the first duplicated portion 803 of the image scene 801, for example, at a cz portion 812 of central display 810.

In some demonstrative embodiments, as shown in FIG. 8, controller 150 (FIG. 1) may be configured to cause the central display 810 to display the second duplicated portion 805 of the image scene 801, for example, at an xcz portion 814 of central display 810.

In some demonstrative embodiments, as shown in FIG. 8, controller 150 (FIG. 1) may be configured to cause the peripheral display 830 to display the first duplicated portion 803 of the image scene 801, for example, at an xtz portion 824 of peripheral display 830.

In some demonstrative embodiments, as shown in FIG. 8, controller 150 (FIG. 1) may be configured to cause the peripheral display 830 to display the second duplicated portion 803 of the image scene 801, for example, at a tz portion 822 of peripheral display 830.

In some demonstrative embodiments, as shown in FIG. 8, the first duplicated portion 803 of the image scene 801 may cover a FoV of at least 5 degrees.

In other embodiments, the first duplicated portion 803 of the image scene 801 may cover any other FoV.

In some demonstrative embodiments, the second duplicated 805 of the image scene 801 may cover a FoV of at least 5 degrees.

In other embodiments, the second duplicated portion 805 of the image scene 801 may cover any other FoV.

In some demonstrative embodiments, controller 150 (FIG. 1) may be configured to adjust a size of the first duplicated portion 803 and/or a size of the second duplicated portion 805 of the image scene 801, e.g., as described below.

In some demonstrative embodiments, controller 150 (FIG. 1) may be configured to determine a size of the first duplicated portion 803 of the image scene 801, and/or a size of the second duplicated portion 805 of the image scene 801, for example, based on an eye-relief setting and/or a tilt angle of HMD device 100 (FIG. 1), e.g., as described below.

Figure 9:
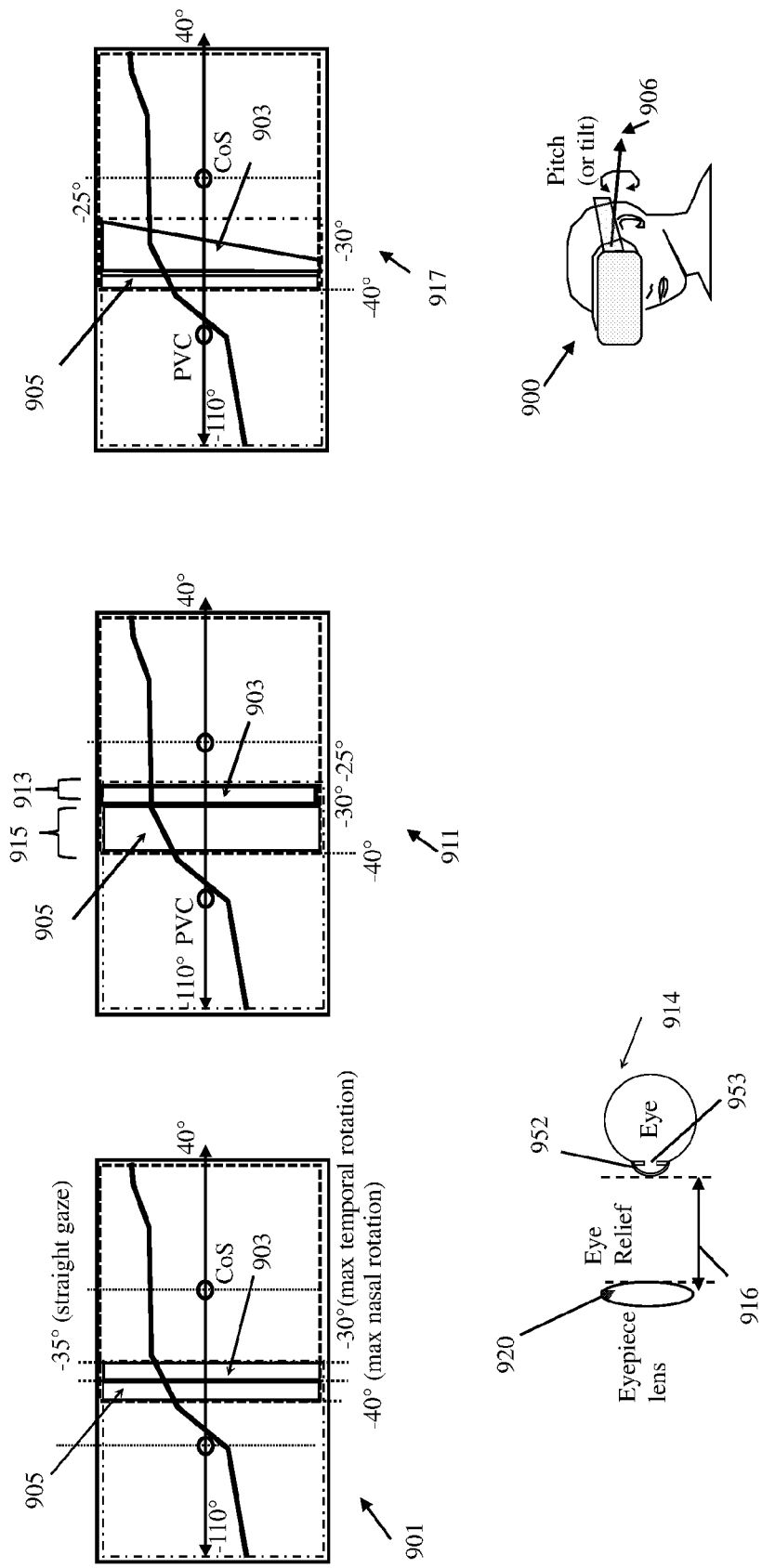
FIG. 9 is a schematic illustration of an adjustment scheme to adjust an image scene to be displayed by an HMD, in accordance with some demonstrative embodiments.

Reference is made to FIG. 9, which schematically illustrates an adjustment scheme 907 to adjust an image scene 901 to be displayed by an HMD device 900, in accordance with some demonstrative embodiments. For example, HMD device 100 (FIG. 1) may include one or more elements of HMD device 900, and/or may perform one or more operations of, and/or one or more functionalities of, HMD device 900.

In some demonstrative embodiments, controller 150 (FIG. 1) may be configured to adjust image scene 801 (FIG. 8), for example, according to adjustment scheme 900, e.g., as described below.

In some demonstrative embodiments, as shown in FIG. 9, image scene 901 may include a first duplicated portion 903 of the image scene 901.

In some demonstrative embodiments, as shown in FIG. 9, image scene 901 may include a second duplicated portion 905 of the image scene 901.

In some demonstrative embodiments, controller 150 (FIG. 1) may be configured to adjust image scene 901, for example, based on an eye-relief setting and/or a tilt angle 906 of HMD device 900.

In some demonstrative embodiments, tilt angle 906 may define a tilt angle between optical axis of central lens of the HMD device 900 and a visual axis of a pupil 953 of an eye a user.

In one example, the tilt angle 906 may be defined as zero, for example, when the head of the user is straight and the user is looking forward to a far image displayed on HMD device 900.

In another example, the tilt angle 906 may be defined as a positive angle, for example, when the head of the user is straight and the user is looking forward and the HMD is tilted up.

In another example, the tilt angle 906 may be defined as a negative angle, for example, when the head of the user is straight and the user is looking forward and the HMD is tilted down.

In some demonstrative embodiments, image scene 901 may correspond to a zero tilt angle 906, and to a pre-defined eye-relief setting 914, e.g., a pre-defined design and/or preferred eye-relief setting.

In some demonstrative embodiments, as shown in FIG. 9, eye-relief setting 914 may correspond to a distance 916 between a cornea 952 of an eye of a user and a central lens 920 of HMD device 900.

In some demonstrative embodiments, controller 150 (FIG. 1) may be configured to adjust image scene 901 into an image scene 911, for example, based on the eye-relief setting 914, as described below.

In some demonstrative embodiments, as shown in FIG. 9, controller 150 (FIG. 1) may be configured to determine a first size 913 of the first duplicated portion 903 and a second size 915 of the second duplicated portion 905. For example, the second size 915 may be configured to be greater than the first size 913, for example, based on an increase in the distance 916 between the cornea 952 and the lens.

In one example, the pupil 953 may miss rays, for example, at a temporal gaze, e.g., when the distance 916 between the pupil and the lens of HMD device 900 increases. Therefore, a nasal gaze overlap zone, e.g., xtz display area 134 (FIG. 1), corresponding to the second duplicated portion 905, may be increased.

In some demonstrative embodiments, controller 150 (FIG. 1) may be configured to adjust image scene 901 into an image scene 917, for example, based on the eye-relief setting 914 and/or tilt angle 906 of HMD device 900, e.g., as described below.

In some demonstrative embodiments, as shown in FIG. 9, controller 150 (FIG. 1) may be configured to determine a size of first duplicated portion 903 of the image scene 901, for example, when HMD device 900 is tilted down, e.g., when a distance between the cornea 952 and a bottom part of the lens of HMD device 900 is less than a distance between the cornea 952 and an upper part of the lens of HMD device 900.

In some demonstrative embodiments, as shown in FIG. 9, an upper part of the first duplicated portion 903 may be larger than a lower part of second duplicated portion 905, for example, as the upper part of first duplicated portion 903 is farther than the lower part of second duplicated portion 905, e.g., when HMD device 900 is tilted down.

In one example, when HMD device 900 is tilted, an upper part of the temporal zone may be shifted toward the center, e.g., when the distance between the cornea 952 and the upper part of the lens of HMD device 900 is increased.

In another example, a bottom part of the temporal zone may be shifted away from the center, e.g., when the distance between the cornea 952 and the bottom part of the lens of HMD device 900 is reduced.

Figure 10:
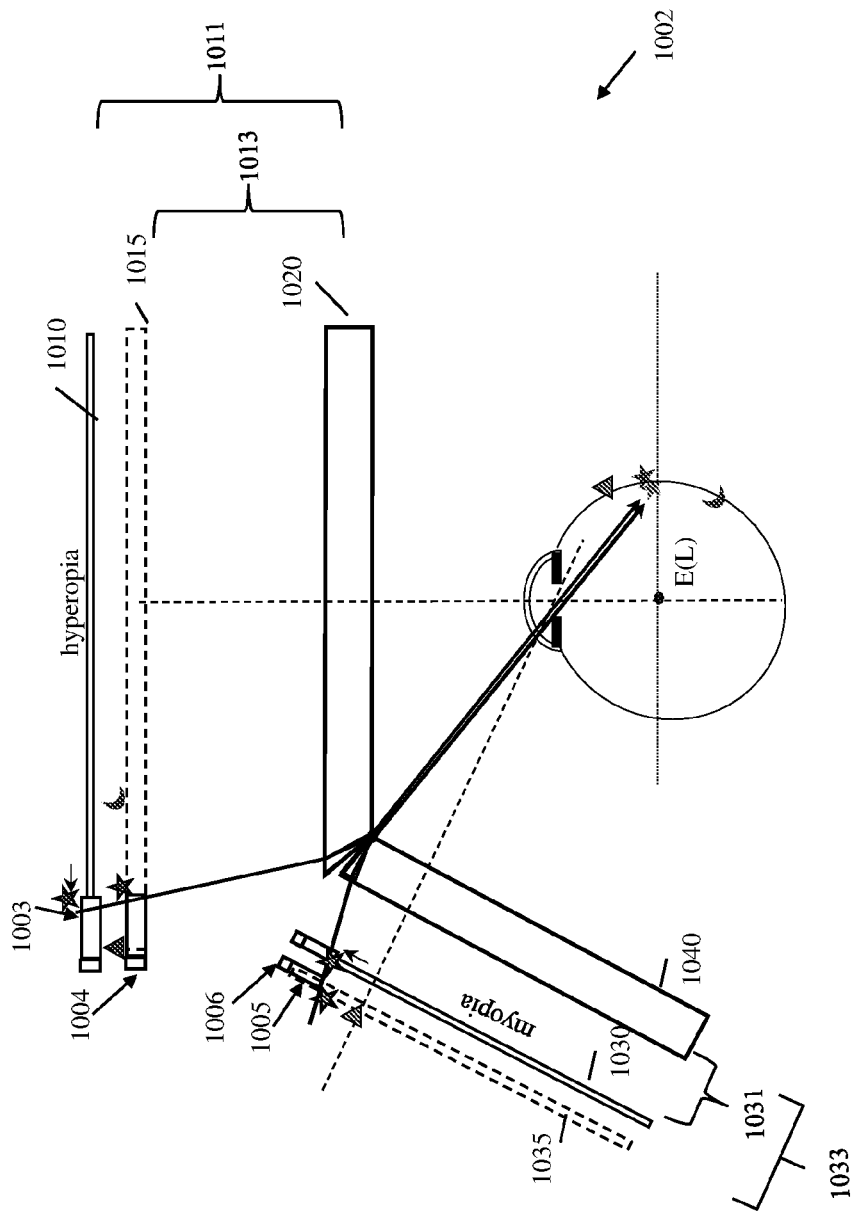
FIG. 10 is a schematic illustration of an HMD, in accordance with some demonstrative embodiments.

Reference is made to FIG. 10, which schematically illustrates an HMD 1002, in accordance with some demonstrative embodiments. For example, HMD 102 (FIG. 1) may include one or more elements of HMD 1002, and/or may perform one or more operations of, and/or one or more functionalities of, HMD 1002.

In some demonstrative embodiments, as shown in FIG. 10, HMD 1002 may include a central display 1010, a central lens 1020, a peripheral display 1030, and a peripheral lens 1040, e.g., as described below.

In some demonstrative embodiments, a lens-display distance, e.g., a lens-display distance between central display 1010 and central lens 1020, and/or a lens-display distance between peripheral display 1030 and a peripheral lens 1040, may be adjusted, for example, to support refractive errors of an eye of a user, e.g., myopia and/or hyperopia, e.g., as described below.

In some demonstrative embodiments, as shown in FIG. 10, a predefined central lens-display distance 1013 between the central lens 1020 and a predefined location 1015 of a central display of HMD 1002 may be set and/or adjusted, e.g., as described below.

In some demonstrative embodiments, as shown in FIG. 10, a predefined peripheral lens-display distance 1033 between the peripheral lens 1040 and a predefined location 1035 of peripheral display 1030 may be set and/or adjusted, e.g., as described below.

In some demonstrative embodiments, as shown in FIG. 10, the central lens-display distance may be increased from the predefined central lens-display distance 1013, for example, towards a central lens-display distance 1011.

In one example, central lens-display distance 1011 may be configured, for example, for a user having hyperopia, e.g., to enable the user a clear view of an image scene, e.g., image scene 801 (FIG. 8), on the central display.

In some demonstrative embodiments, the peripheral lens-display distance may be increased from the predefined peripheral lens-display distance 1035, for example, towards a peripheral lens-display distance (not shown in FIG. 10) in a similar manner, e.g., to enable the user a clear view of the image scene, e.g., image scene 801 (FIG. 8), on the peripheral display.

In some demonstrative embodiments, as shown in FIG. 10, the peripheral lens-display distance may be reduced from the predefined peripheral lens-display distance 1035, for example, towards a peripheral lens-display distance 1031.

In one example, peripheral lens-display distance 1031 may be configured, for example, for a user having myopia, e.g., to enable the user a clear view of an image scene, e.g., image scene 801 (FIG. 8), on the peripheral display.

In some demonstrative embodiments, the central lens-display distance may be reduced from the predefined central lens-display distance 1013, for example, towards a central lens-display distance (not shown in FIG. 10) in a similar manner, e.g., to enable the user a clear view of the image scene, e.g., image scene 801 (FIG. 8), on the central display.

In some demonstrative embodiments, controller 150 (FIG. 1) may be configured to determine and/or adjust a size of a portion 1003 of the image scene to be displayed by an xcz display area, e.g., xcz display area 114 (FIG. 1), for example, based on the central lens-display distance 1011.

In some demonstrative embodiments, controller 150 (FIG. 1) controller 150 (FIG. 1) may be configured to determine and/or adjust a size of a portion 1005 of the image scene to be displayed by an xtz display area, e.g., xtz display area 134 (FIG. 1), for example, based on the peripheral lens-display distance 1031.

In some demonstrative embodiments, adjusting a lens-display distance, e.g., lens-display distance 1011 and/or lens-display distance 1013, may change an object size perception. For example, the image scene may be zoomed, e.g., in or out, for example, for hyperopia and/or myopia, which may require adjusting a size of portions of the image scene to be displayed.

In some demonstrative embodiments, the image scene may be stretched, for example, when zooming-in the image scene, e.g., as a result of reducing the lens-display distance. Accordingly, a size of portions of the image scene may be stretched, for example, before displaying the image scene, e.g., as described below.

In some demonstrative embodiments, as shown in FIG. 10, the size of portion 1003 may be increased, for example, based on zooming-in the image scene. The size of portion 1003 may be increased, for example, by allocating an additional portion 1004 of central display 1010 to display the image scene, for example, to allow stretching of the image scene to be displayed on central display 1010.

In some demonstrative embodiments, as shown in FIG. 10, the size of portion 1005 may be increased, for example, based on zooming-in the image scene. The size of portion 1005 may be increased, for example, by allocating an additional portion 1006 of peripheral display 1030 to display the image scene, for example, to allow stretching of the image scene to be displayed on peripheral display 1030.

In one example, preserving the object size perception may result in preservation of chief rays angels, and therefore, there may be no need to make additional pre-distortions adjustments.

In one example, the adjustment of the sizes of portions 1003 and/or 1005 may provide a technical solution, which may obviate a need to adjust side-cut angles of the central lens 1020 and/or the peripheral lens 1040, e.g., adjustments of side cut 223 of xcz lens portion 224 (FIG. 2) and/or side cut 245 (FIG. 2) of xtz lens portion 244 (FIG. 2).

Referring back to FIG. 1, in some demonstrative embodiments, controller 150 may be configured to validate a continuous FoV of HMD 1102, for example, based on corneal reflection images from the eye of the user, e.g., as described below.

In some demonstrative embodiments, controller 150 may be configured to process image information of a cornea over the pupil 152 to identify a corneal reflection image including a combination of the first image from the central display 110 and the second image from the peripheral display 130, e.g., as described below.

In some demonstrative embodiments, controller 150 may be configured to adjust the first image displayed by the central display 110 and/or the second image displayed by the peripheral display 130, for example, based on the corneal reflection image, e.g., as described below.

In one example, the eye of the user may be monitored, for example, to ensure a continuous FoV. For example, controller 150 may be configured to adjust the first image displayed by the central display 110 and/or the second image displayed by the peripheral display 130, for example, based real time feedback, which may be determined, for example, based on analysis of the corneal reflection image, which may include the combination of the first image from the central display 110 and the second image from the peripheral display 130, and may be reflected from the iris of the eye, e.g., where an intact single source should be presented.

In another example, adjustments of pre-distortions and content distribution to central display 110 and peripheral display 130 may be erroneous, for example, if the first and second images are not fused, and, therefore a continuous realistic panoramic image may be broken.

In some demonstrative embodiments, the first image from the central display 110 may include a first calibration image, and/or the second image from the peripheral display 130 may include a second calibration image, for example, to validate the continuous FoV of HMD 102, e.g., as described below.

In some demonstrative embodiments, controller 150 may be configured to simultaneously cause the central display 110 to display a first calibration image, and the peripheral display 130 to display a second calibration image, e.g., as described below.

In some demonstrative embodiments, controller 150 may be configured to process image information of the cornea, for example, to identify a corneal reflection calibration image including a combination of the first calibration image and the second calibration image, e.g., as described below.

In some demonstrative embodiments, controller 150 may be configured to adjust the first image displayed by the central display 110 and/or the second image displayed by the peripheral display 130, for example, based on the corneal reflection calibration image, e.g., as described below.

In one example, the calibration images may include predefined patterns, which may be displayed as a visible image or as a non-visible image.

In one example, the predefined patterns may include Near Infra-Red (NIR) transparent display stripes, which may be installed, for example, over overlap areas of the central display 110 and/or peripheral display 130.

In another example, the predefined patterns may include native display RGB subpixels.

In another example, the predefined patterns may include any other patterns.

In some demonstrative embodiments, using the predefined pattern may be simple and easy, compared, for example, to analysis of a combination of the first and second images, which may require comparing visible signs, e.g., image reflections that may be shared with regular content, and/or may require cross correlation between regular content and iris reflections, which may require an increased computation complexity.

Figure 11:
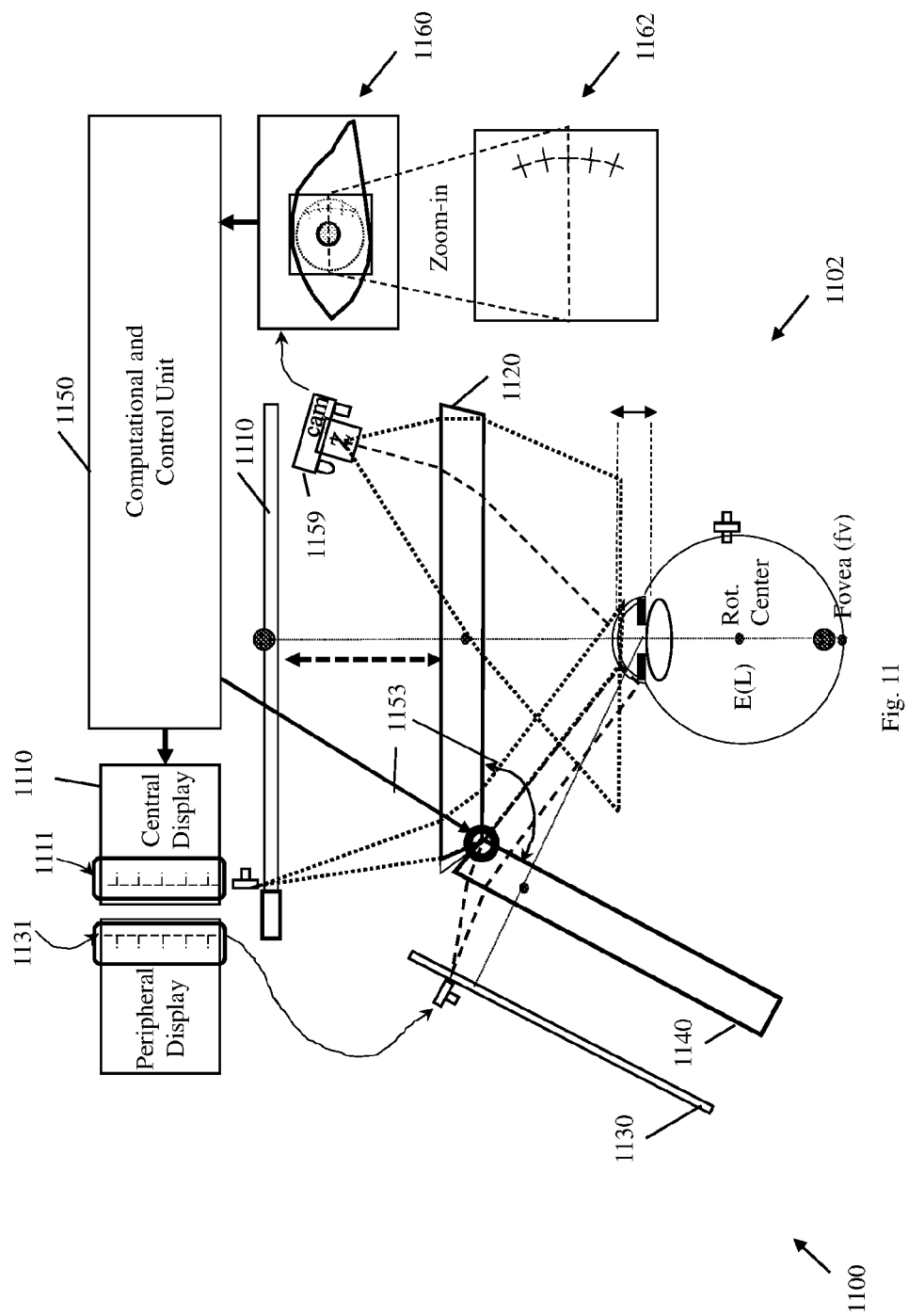
FIG. 11 is a schematic illustration of a validation scheme to validate a continuous Field of View (FoV) of an HMD, in accordance with some demonstrative embodiments.

Reference is made to FIG. 11, which schematically illustrates a validation scheme 1100 to validate a continues FoV of an HMD 1102, in accordance with some demonstrative embodiments. For example, HMD 102 (FIG. 1) may include one or more elements of HMD 1102, and/or may perform one or more operations of, and/or one or more functionalities of, HMD 1102.

In one example, controller 150 may validate the continues FoV of HMD 102 (FIG. 1), for example, according to validation scheme 1100.

In some demonstrative embodiments, as shown in FIG. 11, HMD 1102 may include a central display 1110, a central lens 1120, a peripheral display 1130, a peripheral lens 1140, and a controller 1150, e.g., as described below. For example, controller 150 (FIG. 1) may perform one or more operations of, and/or one or more functionalities of, controller 1150.

In some demonstrative embodiments, as shown in FIG. 11, controller 1150 may be configured to simultaneously cause central display 1110 to display a first calibration image 1111, and peripheral display 130 to display a second calibration image 1131, e.g., as described below.

In some demonstrative embodiments, controller 1150 may be configured to process image information 1160 of the cornea.

In some demonstrative embodiments, image information 1160 may be captured, for example, by a camera 1159.

In one example, gaze tracker 159 (FIG. 1) may include one or more elements of camera 1159, and/or may perform one or more operations of, and/or one or more functionalities of, camera 1159.

In another example, HMD device 100 (FIG. 1) may include camera 1159, for example, in addition to gaze tracker 159 (FIG. 1).

In some demonstrative embodiments, controller 1150 may process the image information 1160 of the cornea, for example, to identify a corneal reflection calibration image 1162 including a combination of the first calibration image 1111 and the second calibration image 1131, e.g., as described below.

In one example, controller 1150 may validate the continues FoV, for example, if the combination of the first calibration image 1111 and the second calibration image 1131 in the corneal reflection calibration image 1162 reflected as a continuous FoV, e.g., a vertical fusion of "+" signs.

In some demonstrative embodiments, controller 1150 may be configured to adjust the first image displayed by the central display 1110 and/or the second image displayed by the peripheral display 1130, for example, based on the corneal reflection calibration image 1162.

In one example, controller 1150 may adjust the first image displayed by the central display 1110 and/or the second image displayed by the peripheral display 1130, for example, if the combination of the first calibration image 1111 and the second calibration image 1131 in the corneal reflection calibration image 1162 is not reflected as a continuous FoV, e.g., not including the vertical fusion of "+" signs.

In some demonstrative embodiments, controller 1150 may be configured to adjust 1153 the tilt angle between the central display 1110 and the peripheral display 1130, for example, based on the corneal reflection calibration image 1162, e.g., as described above.

In some demonstrative embodiments, controller 1150 may be configured to apply pre-distortions for the first image displayed by the central display 1110 and/or the second image displayed by the peripheral display 1130, for example, based on the corneal reflection calibration image 1162.

In one example, camera 1159 may include an NIR eye tracking camera with an NIR structured light (SL), which may be configured to project patterns on a face of the user.

In some demonstrative embodiments, controller 1150 may determine one or HMD parameters, e.g., a 3D shape estimation of the eye, a gaze angle, an ER setting, an IPD setting, a tilt angle, and/or any other parameter and/or attribute, for example, based on analysis of an image including the patterns projected on the face of the user.

In some demonstrative embodiments, controller 1150 may determine, e.g., for each display pixel of central display 1110, an eye-pupil hit-efficiency and/or Visual Acuity (EPHEVA), for example, based on the HMD parameters.

Figure 12:
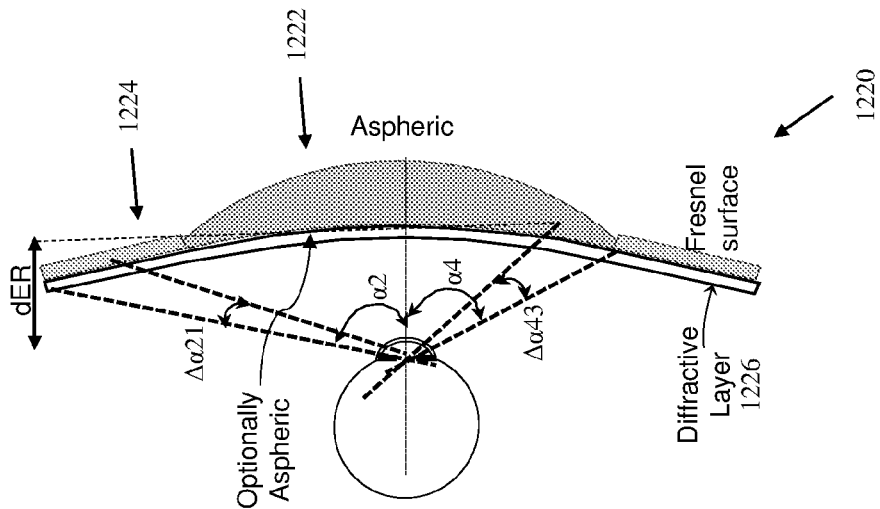
FIG. 12 is a schematic illustration of a flat-hybrid lens and a concave-hybrid lens, which may be implemented in accordance with some demonstrative embodiments.
Figure 12:
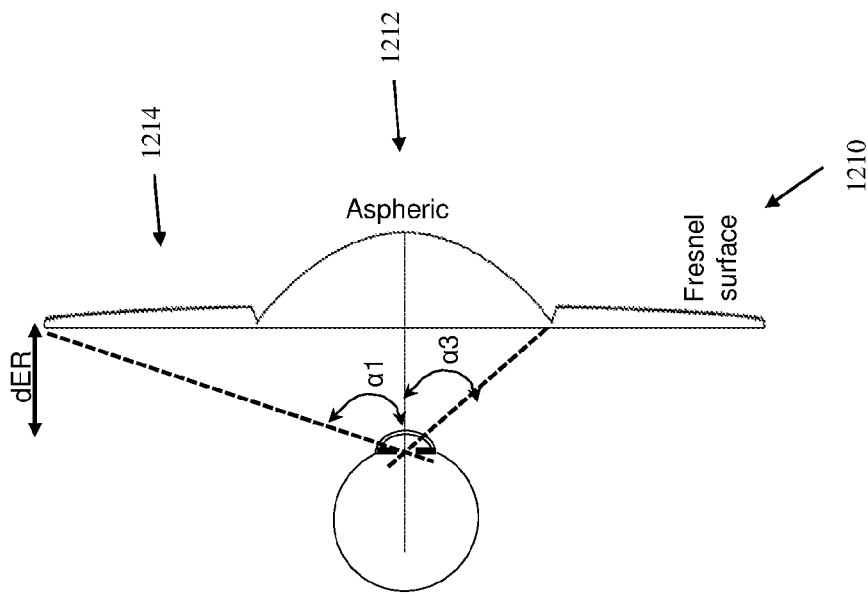

Reference is made to FIG. 12, which schematically illustrates a flat-hybrid lens 1210 and a concave-hybrid lens 1220, which may be implemented in accordance with some demonstrative embodiments.

In one example, central lens 120 (FIG. 1) and/or peripheral lens 140 (FIG. 1) may implemented by, and/or may include, one or more elements of flat-hybrid lens 1210.

In another example, central lens 120 (FIG. 1) and/or peripheral lens 140 (FIG. 1) may implemented by, and/or may include, one or more elements of concave-hybrid lens 1220.

In other embodiments, central lens 120 (FIG. 1) and/or peripheral lens 140 (FIG. 1) may implemented by, and/or may include, any other type of hybrid or non-hybrid lens.

In some demonstrative embodiments, as shown in FIG. 12, flat-hybrid lens 1210 may include at least two freeform parts.

In some demonstrative embodiments, as shown in FIG. 12, flat-hybrid lens 1210 may include a central freeform aspherical lens 1212, and a peripheral freeform Fresnel lens 1214.

In some demonstrative embodiments, as shown in FIG. 12, flat-hybrid lens 1210 may provide a FoV angle, denoted $\alpha 1$.

In some demonstrative embodiments, as shown in FIG. 12, central freeform aspherical lens 1212 may provide a FoV angle, denoted $\alpha 3$, in the FoV angle $\alpha 1$.

In one example, central freeform aspherical lens 1212 may provide sharp vision, e.g., through non-Fresnel optics.

In some demonstrative embodiments, as shown in FIG. 12, concave-hybrid lens 1220 may include at least two freeform parts.

In some demonstrative embodiments, as shown in FIG. 12, concave-hybrid lens 1220 may include a central freeform concave aspherical lens 1222, and a peripheral freeform Fresnel lens 1224.

In some demonstrative embodiments, as shown in FIG. 12, concave-hybrid lens 1220 may include a concave diffractive layer 1226, for example, in front and/or at the back of, central freeform concave aspherical lens 1222 and peripheral freeform Fresnel lens 1224.

In some demonstrative embodiments, as shown in FIG. 12, concave-hybrid lens 1220 may provide a FoV angle, denoted $\alpha 2$.

In some demonstrative embodiments, as shown in FIG. 12, central freeform aspherical lens 1222 may provide a FoV angle, denoted $\alpha 4$ in the FoV angle $\alpha 2$.

In some demonstrative embodiments, as shown in FIG. 12, concave-hybrid lens 1220 may provide a wide FoV, e.g., the FoV angle $\alpha 2$, compared to the FoV angle $\alpha 1$ of flat-hybrid lens 1210. For example, the FoV angle $\alpha 2$ may cover the FoV angle $\alpha 1$, and an additional FoV angle, denoted $\Delta \alpha 21$. For example, the FoV angle $\alpha 4$ may cover the FoV angle $\alpha 3$, and an additional FoV angle, denoted $\Delta \alpha 43$.

In one example, as shown in FIG. 12, concave-hybrid lens 1220 may be convex from a display side and concave from an eye side.

In one example, as shown in FIG. 12, peripheral freeform Fresnel lens 1224 may be co-radial with central freeform concave aspherical lens 1222 from the eye side.

In some demonstrative embodiments, concave-hybrid lens 1220 may be configured to compensate a color dispersion, for example, by diffractive structures, e.g., diffractive layer 1226, which may be at least on one lens side.

In some demonstrative embodiments, concave-hybrid lens 1220 may be different from flat-hybrid lens 1210, for example, by having different lens shapes, and/or by using a diffractive layer, e.g., concave diffractive layer 1226.

In some demonstrative embodiments, as shown in FIG. 12, concave-hybrid lens 1220 may include two aspherical refractive surfaces and two diffractive surfaces, which may add flexibility, for example, to create variable Visual Acuity (VA) over one or more FoV angles. For example, the variable VA may be configured such that the VA may reduce with an increase of a FoV angle.

In some demonstrative embodiments, concave-hybrid lens 1220 may be formed of one or more types of material, which may be configured, for example, for near eye display optics, e.g., as described below.

In one example, lenses formed of materials having a medium to high Abbe Number (AN) may minimize chromatic aberrations. However, the materials having a medium to high AN may have a limited Refractive Index (RI), e.g., for polymers a higher RI may lower the AN. Accordingly, these materials may pose limitations on the thickness and/or diameter of a lens.

In some demonstrative embodiments, the concave-hybrid lens 1220 and/or the flat-hybrid lens 1210 may be formed of a material having an RI to AN (RI/AN) ratio of at least 0.03.

In one example, a lens may be formed of one or more of the following materials:

TABLE 1

| Material | Refractive Index (RI) | Abbe Number (AN) | RI/AN Ratio |
|---|---|---|---|
| Material to provide high RI/AN ratio | 1.8 | 19 | 0.095 |
| MR174 | 1.74 | 29 | 0.060 |
| PC | 1.59 | 29 | 0.055 |
| Zeonex | 1.53 | 55 | 0.028 |
| PMMA | 1.49 | 55 | 0.027 |

In one example, the concave-hybrid lens 1220 and/or the flat-hybrid lens 1210 may be formed of one or more of the materials of Table 1. In other embodiments, the concave-hybrid lens 1220 and/or the flat-hybrid lens 1210 may be formed of any other materials.

In some demonstrative embodiments, the concave diffractive layer 1226 may be implemented to support implementation of lens materials having an RI/AN ratio of at least 0.03, for example, for a same diameter, a same ER, and/or a same optical power, e.g., when using lenses of materials characterized by an RI/AN ratio of less than 0.03.

In some demonstrative embodiments, the concave-hybrid lens 1220 may be implemented to support an increased FoV angle, e.g., the FoV angle α4, which may increase the FoV angle α3, e.g., by an additional FoV angle Δα43.

In some demonstrative embodiments, a concave shape of the concave-hybrid lens 1220 may be configured to preserve a central ER, and an enlarged FoV angle, e.g., FoV angle α2.

In some demonstrative embodiments, the concave-hybrid lens 1220 may be formed by a material having a relatively low AN, e.g., and an RI/AN ratio of at least 0.03, for example, to provide a technical solution allowing the concave diffractive layer 1226 to contribute more in ray deviation per given lens slope, for example, while compensating chromatic aberrations created by refraction.

Figure 13:
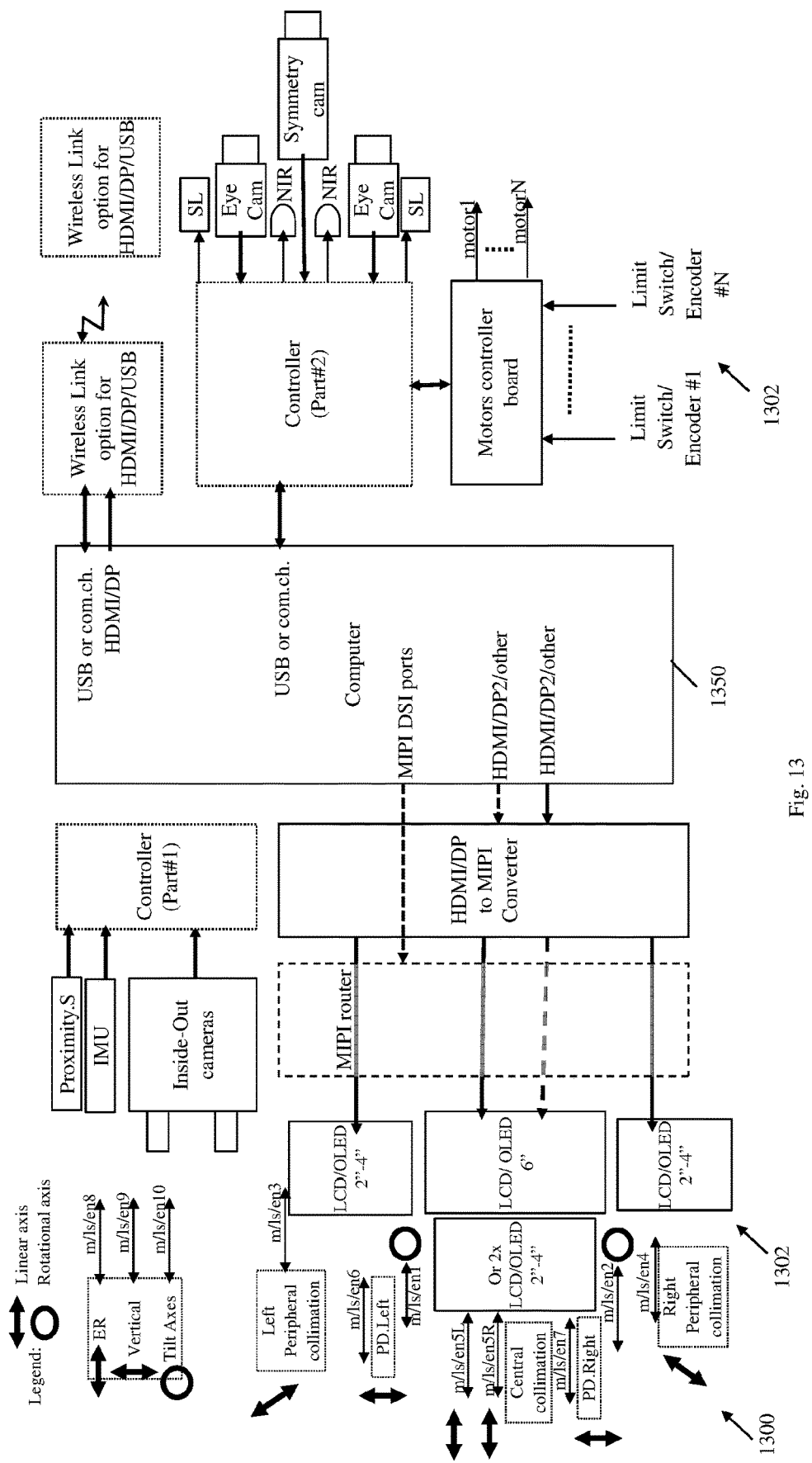
FIG. 13 is a schematic block diagram of a system 1300 including a computing device and an HMD device, in accordance with some demonstrative embodiments.

Reference is made to FIG. 13, which schematically illustrates a block diagram of a system 1300 including a computing device 1350 and an HMD device 1302, in accordance with some demonstrative embodiments.

In one example, HMD device 100 (FIG. 1) may include one or more elements of HMD device 1302, and/or may perform one or more operations of, and/or one or more functionalities of, HMD device 1302.

In one example, computing device 1350 may include one or more processors, software and/or hardware configured to process and/or provide images to be displayed by HMD device 1302.

In some demonstrative embodiments, HMD device 1302 may be configured to interface with computing device 1350 and to receive from computing device 1350 an image scene to be displayed by HMD device 1302.

In some demonstrative embodiments, computing device 1350 may be based on x86 or RISC architecture and/or any other architecture, which may be strong enough to render intense graphical information for extended reality.

In some demonstrative embodiments, system 1300 may optionally include one or more controllers, denoted controller part #1 and controller part #2, and/or one or more serving sensors, motors and/or analog electronics, which may provide one or more interfaces to be added on to computing device 1350 and/or to provide a close control loop, e.g., faster than computing device 1350.

In some demonstrative embodiments, HMD device 1302 may include MIPI-DSI mini-displays, and computing device 1350 may provide direct MIPI DSI interfaces and/or converted interfaces, e.g., through bridges from one or more other ports, e.g., HDMI, DP, LVDS, and/or any other type of interfaces and/or corresponding bridging circuitry to drive the mini-displays of HMD device 1302.

In one example, a number of MIPI-DSI interfaces or any other interfaces of computing device 1350 may be less than a number of displays, e.g., 3 displays if a central display is shared for the left and right eyes, or 4 displays if all displays are not shared. According to this example, MIPI and/or other router circuitry may be used to drive all displays and/or to manage the bandwidth with priority for central display and/or with foveated rendering.

In some demonstrative embodiments, HMD device 1302 may optionally include a set of motorized linear and/or rotational axes, e.g., with limited switches and/or encoders.

In some demonstrative embodiments, HMD device 1302 may optionally include eye tracking and/or ER analysis modules, which may be connected with a symmetry camera, e.g., directly to computer 1350, or through a controller of HMD device 1302. Such an implementation may reduce a load on computing device 1350, for example, by allowing HMD device 1302 to perform local image processing and/or close loop with control of the motors and/or content generation control.

In some demonstrative embodiments, HMD device 1302 may optionally include a stereo-camera for inside-out tracking, and/or one or more cameras for 360 degree tracking and/or SLAM.

In some demonstrative embodiments, HMD device 1302 may optionally include one or more IMU sensors, for example, to indicate to computing device 1350 which information from a 360 degree sphere may be rendered and distributed through the displays.

In one example, fine tuning of information distribution through peripheral displays may be performed, for example, according to eye tracking and/or coordinated with motorized axes.

In some demonstrative embodiments, the ER setting, the vertical axis and/or the tilt axis may be used to adjust a position of HMD device 1302, for example, after it is mounted on the head of the user.

In some demonstrative embodiments, pupillary distance axes may be used for centration of left and/or right Visual Units (VUs), for example, a left-hand VU including central display 160 (FIG. 1), central lens 165 (FIG. 1), peripheral display 170 (FIG. 1) and peripheral lens 175 (FIG. 1), and/or a right-hand VU including central display 110 (FIG. 1), central lens 120 (FIG. 1), peripheral display 130 (FIG. 1) and peripheral lens 140 (FIG. 1), e.g., in front of each eye.

In some demonstrative embodiments, HMD device 1302 may optionally include two or more rotational axes configured to adjust the tilt angle between the central and peripheral displays.

In some demonstrative embodiments, HMD device 1302 may optionally include a plurality of linear axes, e.g., 4 linear axes, configured to set distances between the displays and the lenses of HMD device 1302.

In some demonstrative embodiments, a symmetry camera may be configured to detect an improper mount of HMD device 1302 on the head, for example, using analysis of face anatomical structures, and may be configured to provide an alert for an improper mounting, e.g., to allow the user to improve the headset position.

Figure 14:
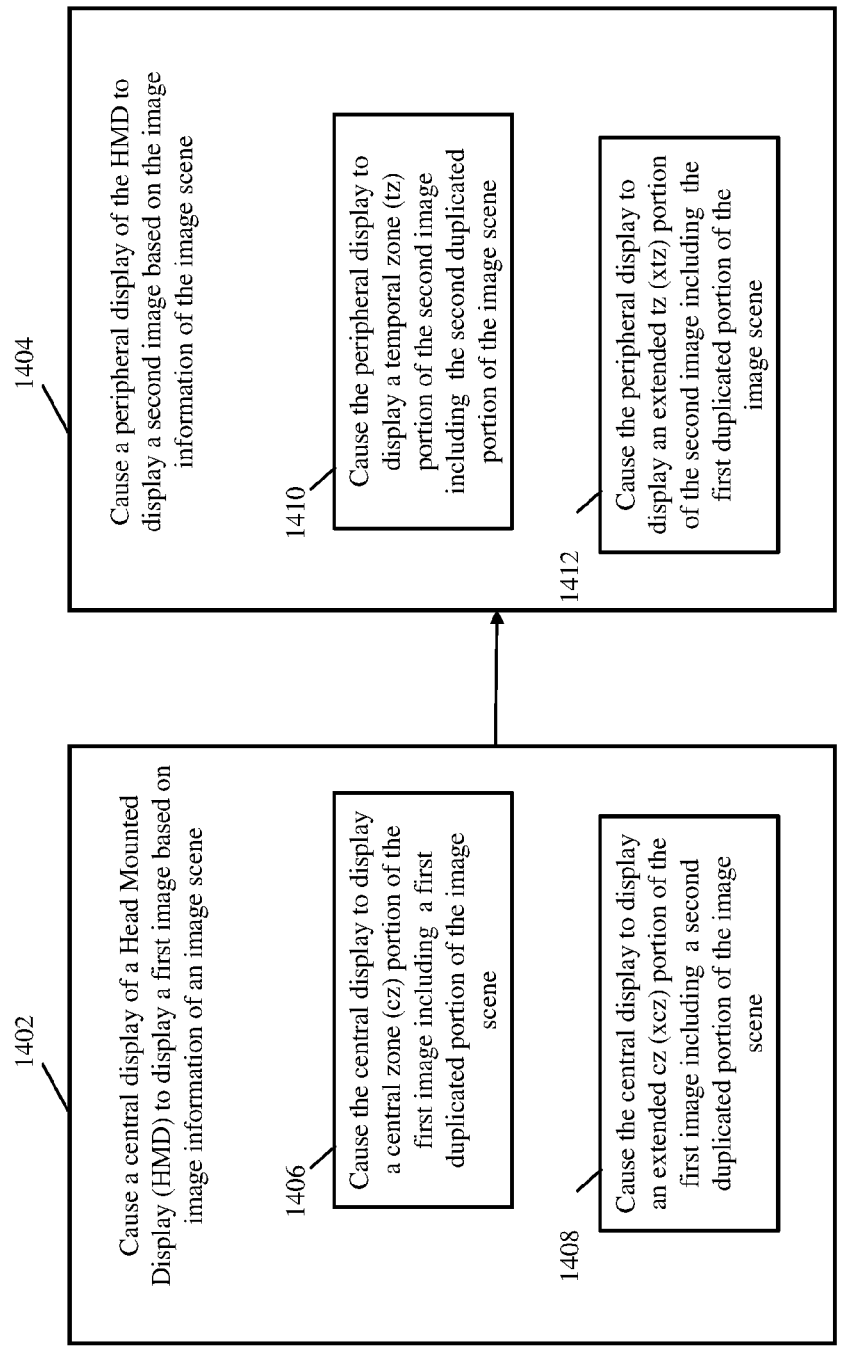
FIG. 14 is a schematic flow-chart illustration of a method of controlling an HMD, in accordance with some demonstrative embodiments.

Reference is made to FIG. 14, which schematically illustrates a method of controlling an HMD, in accordance with some demonstrative embodiments. For example, one or more of the operations of the method of FIG. 14 may be performed by an HMD device, e.g., HMD device 100 (FIG. 1); an HMD, e.g., HMDs 102 and/or 104 (FIG. 1); a controller, e.g., controller 150 (FIG. 1) and/or controller 1150 (FIG. 11).

As indicated at block 1402, the method may include causing a central display of the HMD to display a first image based on image information of an image scene. For example, controller 150 (FIG. 1) may cause central display 110 (FIG. 1) to display the first image based on the image information of the image scene, e.g., as described above.

As indicated at block 1404, the method may include causing a peripheral display of the HMD to display a second image based on the image information of the image scene. For example, controller 150 (FIG. 1) may cause peripheral display 140 (FIG. 1) to display the first image based on the image information of the image scene, e.g., as described above.

As indicated at block 1406, causing the central display to display the first image may include causing the central display to display a cz portion of the first image including a first duplicated portion of the image scene. For example, controller 150 (FIG. 1) may cause central display 110 (FIG. 1) to display the cz portion of the first image including the first duplicated portion 803 (FIG. 8) of the image scene 801 (FIG. 8), e.g., as described above.

As indicated at block 1408, causing the central display to display the first image may include causing the central display to display an xcz portion of the first image including a second duplicated portion of the image scene. For example, controller 150 (FIG. 1) may cause central display 110 (FIG. 1) to display the xcz portion of the first image including the second duplicated portion 805 (FIG. 8) of the image scene 801 (FIG. 8), e.g., as described above.

As indicated at block 1410, causing the peripheral display to display the second image may include causing the peripheral display to display a tz portion of the second image including the second duplicated portion of the image scene. For example, controller 150 (FIG. 1) may cause peripheral display 130 (FIG. 1) to display the tz portion of the second image including the second duplicated portion 805 (FIG. 8) of the image scene 801 (FIG. 8), e.g., as described above.

As indicated at block 1412, causing the peripheral display to display the second image may include causing the peripheral display to display an xtz portion of the second image including the first duplicated portion of the image scene. For example, controller 150 (FIG. 1) may cause peripheral display 130 (FIG. 1) to display the xtz portion of the second image including the first duplicated portion 803 (FIG. 8) of the image scene 801 (FIG. 8), e.g., as described above.

Figure 15:
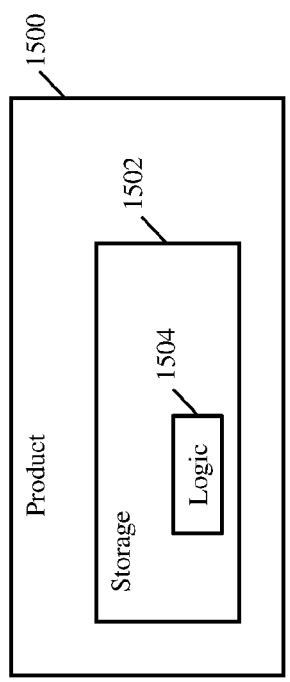
FIG. 15 is a schematic block diagram illustration of a product of manufacture, in accordance with some demonstrative embodiments.

Reference is made to FIG. 15, which schematically illustrates a product of manufacture 1500, in accordance with some demonstrative embodiments. Product 1500 may include one or more tangible computer-readable ("machine readable") non-transitory storage media 1502, which may include computer-executable instructions, e.g., implemented by logic 1504, operable to, when executed by at least one processor, e.g., computer processor, enable the at least one processor to implement one or more operations of HMD device 100 (FIG. 1), HMD 102 and/or 104 (FIG. 1), and/or controller 150 (FIG. 1), to perform one or more operations, and/or to perform, trigger and/or implement one or more operations, and/or functionalities described above with reference to FIGS. 1, 2, 3, 4, 5, 6, 7, 8, 9, 10, 11, 12, 13 and/or 14, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative embodiments, product 1500 and/or storage media 1502 may include one or more types of computer-readable storage media capable of storing data, including volatile memory, non-volatile memory, removable or non-removable memory, erasable or non-erasable memory, writeable or re-writeable memory, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language. Functions, operations, components and/or features described herein with reference to one or more embodiments, may be combined with, or may be utilized in combination with, one or more other functions, operations, components and/or features described herein with reference to one or more other embodiments, or vice versa.

EXAMPLES

The following examples pertain to further embodiments.

Example 1 includes a Head Mounted Display (HMD) device comprising a central display configured to display a first image in a central Field of View (FoV) based on an image scene to be displayed to a pupil of a user, the central display comprising a central zone (cz) display area to display a cz portion of the first image, and an extended central zone (xcz) display area to display an xcz portion of the first image, the xcz display area adjacent to the cz display area; a central lens configured to direct light of the first image toward the pupil of the user, the central lens comprising a cz lens portion, and an xcz lens portion adjacent to the cz lens portion, the cz lens portion configured to direct light of the cz portion of the first image toward the pupil at a straight gaze of the pupil, at a nasal gaze of the pupil and at a temporal gaze of the pupil, the xcz lens portion configured to direct light of the xcz portion of the first image toward the pupil at the nasal gaze of the pupil; a peripheral display configured to display a second image in a temporal FoV based on the image scene, the peripheral display comprising a temporal zone (tz) display area to display a tz portion of the second image, and an extended temporal zone (xtz) display area to display an xtz portion of the second image, the xtz display area adjacent to the tz display area; and a peripheral lens configured to direct light of the second image toward the pupil of the user, the peripheral lens is tilted at a tilt angle relative to the central lens, the peripheral lens comprising a tz lens portion, and an xtz lens portion, the tz lens portion configured to direct light of the tz portion of the second image toward the pupil at the straight gaze of the pupil, the temporal gaze of the pupil and the nasal gaze of the pupil, the xtz lens portion configured to direct light of the xtz portion of the second image toward the pupil at the temporal gaze of the pupil.

Example 2 includes the subject matter of Example 1, and optionally, wherein the HMD device is configured to provide a continuous nasal gaze FoV to the pupil at the nasal gaze, the continuous nasal gaze FoV comprising the light of the cz portion of the first image directed by the cz lens portion toward the pupil at the nasal gaze, the light of the xcz portion of the first image directed by the xcz lens portion toward the pupil at the nasal gaze, and the light of the tz portion of the second image directed by the tz lens portion toward the pupil at the nasal gaze.

Example 3 includes the subject matter of Example 1 or 2, and optionally, wherein the HMD device is configured to provide a continuous temporal gaze FoV to the pupil at the temporal gaze, the continuous temporal gaze FoV comprising the light of the cz portion of the first image directed by the cz lens portion toward the pupil at the temporal gaze, the light of the xtz portion of the second image directed by the xtz lens portion toward the pupil at the temporal gaze, and the light of the tz portion of the second image directed by the tz lens portion toward the pupil at the temporal gaze.

Example 4 includes the subject matter of any one of Examples 1-3, and optionally, comprising a controller configured to cause the central display to display the first image based on image information of the image scene, and to cause the peripheral display to display the second image based on the image information of the image scene.

Example 5 includes the subject matter of Example 4, and optionally, wherein the controller is configured to cause the central display to display the cz portion of the first image comprising a first duplicated portion of the image scene; and display the xcz portion of the first image comprising a second duplicated portion of the image scene; and cause the peripheral display to display the tz portion of the second image comprising the second duplicated portion of the image scene; and display the xtz portion of the second image comprising the first duplicated portion of the image scene.

Example 6 includes the subject matter of Example 5, and optionally, wherein the second duplicated portion of the image scene covers a FoV of at least 5 degrees.

Example 7 includes the subject matter of Example 5, and optionally, wherein the first duplicated portion of the image scene covers a FoV of at least 5 degrees.

Example 8 includes the subject matter of any one of Examples 5-7, and optionally, wherein the controller is configured to determine a size of at least one of the first duplicated portion of the image scene or the second duplicated portion of the image scene based on at least one of an eye-relief setting or a tilt angle of the HMD device.

Example 9 includes the subject matter of any one of Examples 5-8, and optionally, wherein the controller is configured to determine a size of the second duplicated portion of the image scene based on a central lens-display distance between the central lens and the central display.

Example 10 includes the subject matter of any one of Examples 5-9, and optionally, wherein the controller is configured to determine a size of the first duplicated portion of the image scene based on a peripheral lens-display distance between the peripheral lens and the peripheral display.

Example 11 includes the subject matter of any one of Examples 4-10, and optionally, wherein the controller is configured to, based on identification of the straight gaze of the pupil, generate the second image by applying a first trapezoidal pre-distortion to a portion of the image scene to be displayed by the peripheral display; based on identification of a non-straight gaze of the pupil, generate the second image by applying a second trapezoidal pre-distortion to the portion of the image scene to be displayed by the peripheral display, the second trapezoidal pre-distortion is different from the first trapezoidal pre-distortion.

Example 12 includes the subject matter of Example 11, and optionally, wherein the controller is configured to determine the second trapezoidal pre-distortion to be less than the first trapezoidal pre-distortion, based on identification of the temporal gaze of the pupil.

Example 13 includes the subject matter of Example 11 or 12, and optionally, wherein the controller is configured to determine the second trapezoidal pre-distortion to be greater than the first trapezoidal pre-distortion, based on identification of the nasal gaze of the pupil.

Example 14 includes the subject matter of any one of Examples 4-13, and optionally, wherein the controller is configured to determine a pre-distortion based on at least one of an eye-relief setting of the HMD device, a tilt angle of the HMD device, or an interpupillary distance (IPD) of the user, and to apply the pre-distortion to at least one portion of the image scene, the at least one portion of the image scene comprising at least one of an image portion to be displayed by the central display, or an image portion to be displayed by the peripheral display.

Example 15 includes the subject matter of any one of Examples 4-14, and optionally, wherein the controller is configured to calibrate a color gamut of the first image relative to a color gamut of the second image based on one or more spectral attributes of at least one of the central lens or the peripheral lens.

Example 16 includes the subject matter of any one of Examples 4-15, and optionally, wherein the controller is configured to calibrate a spatial light intensity of the first image relative to a spatial light intensity of the second image based on one or more spectral attributes of at least one of the central lens or the peripheral lens.

Example 17 includes the subject matter of any one of Examples 4-16, and optionally, wherein the controller is configured to identify a tilt setting of the tilt angle of the peripheral lens relative to the central lens, and to determine a portion of the image scene to be displayed by the peripheral display based on the tilt setting.

Example 18 includes the subject matter of any one of Examples 4-17, and optionally, wherein the controller is configured to monitor a gaze angle of the pupil, and to dynamically adjust the tilt angle of the peripheral lens relative to the central lens based on the gaze angle of the pupil.

Example 19 includes the subject matter of any one of Examples 4-18, and optionally, wherein the controller is configured to process image information of a cornea over the pupil to identify a corneal reflection image comprising a combination of the first image from the central display and the second image from the peripheral display; and based on the corneal reflection image, adjust at least one of the first image displayed by the central display or the second image displayed by the peripheral display.

Example 20 includes the subject matter of Example 19, and optionally, wherein the HMD device is configured to simultaneously cause the central display to display a first calibration image, and the peripheral display to display a second calibration image; process image information of the cornea to identify a corneal reflection calibration image comprising a combination of the first calibration image and the second calibration image; and, based on the corneal reflection calibration image, adjust at least one of the first image displayed by the central display or the second image displayed by the peripheral display.

Example 21 includes the subject matter of any one of Examples 1-20, and optionally, comprising a tilt angle adjuster to adjust the tilt angle of the peripheral lens relative to the central lens.

Example 22 includes the subject matter of any one of Examples 1-21, and optionally, wherein the central lens is separated from the peripheral lens by a distance of at least 1 millimeter (mm).

Example 23 includes the subject matter of any one of Examples 1-22, and optionally, wherein the central lens is separated from the peripheral lens by a distance of at least 1 millimeter (mm) in a plane connecting optical axes of the central lens and the peripheral lens.

Example 24 includes the subject matter of any one of Examples 1-21, and optionally, wherein an edge of the central lens is in direct contact with an edge of the peripheral lens.

Example 25 includes the subject matter of any one of Examples 1-24, and optionally, wherein the peripheral display comprises an other xtz display portion to display an other xtz portion of the second image, and the peripheral lens comprises an other xtz lens portion configured to direct light of the other xtz portion of the second image toward the pupil at the temporal gaze of the pupil, and wherein the tz lens portion is between the xtz lens portion and the other xtz lens portion.

Example 26 includes the subject matter of any one of Examples 1-25, and optionally, wherein a first part of the cz lens portion is configured to direct light beams from a first part of the cz display area to a center of eye rotation corresponding to the pupil, wherein a second part of the cz lens portion is configured to direct light beams from a second part of the cz display area to a point defined based on a position of the pupil at the straight gaze angle, wherein the xcz lens portion is configured to direct light beams from the xcz display area to a point defined based on a position of the pupil at the nasal gaze angle, and wherein the first part of the cz lens portion is between the xcz lens portion and the second part of the cz lens portion.

Example 27 includes the subject matter of any one of any one of Examples 1-26, and optionally, wherein the tz lens portion is configured to direct light beams from the tz display area to a point defined based on a position of the pupil at the straight gaze angle, and wherein the xtz lens portion is configured to direct light beams from the xtz display area to a center of eye rotation corresponding to the pupil.

Example 28 includes the subject matter of Example 27, and optionally, wherein the peripheral lens comprises an other xtz lens portion configured to direct light beams from an other xtz display area of the peripheral display to a point defined based on a position of the pupil at the temporal gaze angle, and wherein the tz lens portion is between the xtz lens portion and the other xtz lens portion.

Example 29 includes the subject matter of any one of Examples 1-28, and optionally, wherein a top part and a bottom part of the central lens are configured to direct light beams from the cz display area to a point defined based on a position of the pupil at the straight gaze angle, and wherein a middle part of the central lens, which is between the top part and the bottom part of the central lens, is configured to direct light beams from the cz display area to a center of eye rotation corresponding to the pupil.

Example 30 includes the subject matter of any one of Examples 1-29, and optionally, wherein each of the central FoV and the temporal FoV comprises a horizontal FoV of at least 45 degrees.

Example 31 includes the subject matter of any one of Examples 1-30, and optionally, wherein each of the central FoV and the temporal FoV comprises a horizontal FoV of at least 60 degrees.

Example 32 includes the subject matter of any one of Examples 1-31, and optionally, wherein each of the central FoV and the temporal FoV comprises a horizontal FoV of at least 70 degrees.

Example 33 includes the subject matter of any one of Examples 1-32, and optionally, wherein each of the central FoV and the temporal FoV comprises a horizontal FoV of at least 80 degrees.

Example 34 includes the subject matter of any one of Examples 1-33, and optionally, wherein each of the central FoV and the temporal FoV comprises a vertical FoV of at least 80 degrees.

Example 35 includes the subject matter of any one of Examples 1-34, and optionally, wherein the central FoV and the temporal FoV are configured to form a continuous horizontal FoV of at least 130 degrees.

Example 36 includes the subject matter of any one of Examples 1-35, and optionally, wherein the central FoV and the temporal FoV are configured to form a continuous horizontal FoV of at least 180 degrees.

Example 37 includes the subject matter of any one of Examples 1-36, and optionally, wherein at least one lens of the central lens or the peripheral lens comprises a hybrid convex-concave lens, the hybrid convex-concave lens is convex in a display direction and concave in an eye direction, the hybrid convex-concave lens comprising a central freeform aspherical lens portion, and a peripheral freeform Fresnel lens portion.

Example 38 includes the subject matter of Example 37, and optionally, wherein the hybrid convex-concave lens is formed of a material having a ratio of at least 0.03 between a refraction index and an abbe number.

Example 39 includes the subject matter of any one of Examples 1-38, and optionally, comprising a first HMD to display a first image scene to a first pupil of the user, the first HMD display comprising the central display, the central lens, the peripheral display, and the peripheral lens; and a second HMD to display a second image scene to a second pupil of the user, the second HMD display comprising an other central display, an other central lens, an other peripheral display, and an other peripheral lens.

Example 40 includes a method of controlling an HMD device according to any one of Examples 1-39, the method comprising causing a central display of the HMD to display a first image based on image information of an image scene; and causing a peripheral display of the HMD to display a second image based on the image information of the image scene.

Example 41 includes the subject matter of Example 40, and optionally, wherein causing the central display to display the first image comprises causing the central display to display a cz portion of the first image including a first duplicated portion of the image scene.

Example 42 includes the subject matter of Example 40 or 41, and optionally, wherein causing the central display to display the first image comprises causing the central display to display an xcz portion of the first image including a second duplicated portion of the image scene.

Example 43 includes the subject matter of any one of Examples 40-42, and optionally, wherein causing the peripheral display to display the second image comprises causing the peripheral display to display a tz portion of the second image including the second duplicated portion of the image scene.

Example 44 includes the subject matter of any one of Examples 40-43, and optionally, wherein causing the peripheral display to display the second image comprises causing the peripheral display to display an xtz portion of the second image including the first duplicated portion of the image scene Example 45 includes an apparatus comprising means for executing any of the described operations of Examples 1-44.

Example 46 includes a product comprising one or more tangible computer-readable non-transitory storage media comprising computer-executable instructions operable to, when executed by at least one processor, enable the at least one processor to cause an HMD device to perform any of the described operations of Examples 1-44.

Example 47 includes an apparatus comprising: a memory interface; and processing circuitry configured to: perform any of the described operations of Examples 1-44.

Example 48 includes a method comprising any of the described operations of Examples 1-44.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A Head Mounted Display (HMD) device comprising:
   a central display configured to display a first image in a central Field of View (FoV) based on an image scene to be displayed to a pupil of a user, the central display comprising a central zone (cz) display area to display a cz portion of the first image, and an extended central zone (xcz) display area to display an xcz portion of the first image, the xcz display area adjacent to an end of the cz display area, the xcz display area configured as an extension to the cz display area in a direction away from a nose of the user;
   a central lens configured to direct light of the first image toward the pupil of the user, the central lens comprising a cz lens portion, and an xcz lens portion adjacent to an end of the cz lens portion, the cz lens portion configured to direct light of the cz portion of the first image toward the pupil at a straight gaze of the pupil, at a nasal gaze of the pupil and at a temporal gaze of the pupil, the xcz lens portion configured to direct light of the xcz portion of the first image toward the pupil at the nasal gaze of the pupil;
   a peripheral display configured to display a second image in a temporal FoV based on the image scene, the peripheral display comprising a temporal zone (tz) display area to display a tz portion of the second image, and an extended temporal zone (xtz) display area to display an xtz portion of the second image, the xtz display area adjacent to an end of the tz display area, the xtz display area configured as an extension to the tz display area in a direction toward the nose of the user; and
   a peripheral lens configured to direct light of the second image toward the pupil of the user, the peripheral lens is tilted at a tilt angle relative to the central lens, the peripheral lens comprising a tz lens portion, and an xtz lens portion adjacent to an end of the tz lens portion, the tz lens portion configured to direct light of the tz portion of the second image toward the pupil at the straight gaze of the pupil, at the temporal gaze of the pupil and at the nasal gaze of the pupil, the xtz lens portion configured to direct light of the xtz portion of the second image toward the pupil at the temporal gaze of the pupil,
   wherein the xcz lens portion is configured to refract a chief ray from the xcz display area such that the chief ray from the xcz display area is to be combined with a chief ray from the tz display area, which is refracted by the tz lens portion, to form a combined nasal-gaze chief ray toward the pupil at the nasal gaze of the pupil,
   wherein the xtz lens portion is configured to refract a chief ray from the xtz display area such that the chief ray from the xtz display area is to be combined with a chief ray from the cz display area, which is refracted by the cz lens portion, to form a combined temporal-gaze chief ray toward the pupil at the temporal gaze of the pupil.

2. The HMD device of claim 1 configured to provide a continuous nasal gaze FoV to the pupil at the nasal gaze, the continuous nasal gaze FoV comprising the light of the cz portion of the first image directed by the cz lens portion toward the pupil at the nasal gaze, the light of the xcz portion of the first image directed by the xcz lens portion toward the pupil at the nasal gaze, and the light of the tz portion of the second image directed by the tz lens portion toward the pupil at the nasal gaze.

3. The HMD device of claim 1 configured to provide a continuous temporal gaze FoV to the pupil at the temporal gaze, the continuous temporal gaze FoV comprising the light of the cz portion of the first image directed by the cz lens portion toward the pupil at the temporal gaze, the light of the xtz portion of the second image directed by the xtz lens portion toward the pupil at the temporal gaze, and the light of the tz portion of the second image directed by the tz lens portion toward the pupil at the temporal gaze.

4. The HMD device of claim 1 comprising a controller configured to cause the central display to display the first image based on image information of the image scene, and to cause the peripheral display to display the second image based on the image information of the image scene.

5. The HMD device of claim 4, wherein the controller is configured to:
   cause the central display to:
      display the cz portion of the first image comprising a first duplicated portion of the image scene; and
      display the xcz portion of the first image comprising a second duplicated portion of the image scene; and
   cause the peripheral display to:
      display the tz portion of the second image comprising the second duplicated portion of the image scene; and
      display the xtz portion of the second image comprising the first duplicated portion of the image scene.

6. The HMD device of claim 5, wherein at least one of the second duplicated portion of the image scene or the first duplicated portion of the image scene covers a FoV of at least 5 degrees.

7. The HMD device of claim 5, wherein the controller is configured to determine a size of at least one of the first duplicated portion of the image scene or the second duplicated portion of the image scene based on at least one of an eye-relief setting or a tilt angle of the HMD device.

8. The HMD device of claim 5, wherein the controller is configured to determine a size of the second duplicated portion of the image scene based on a central lens-display distance between the central lens and the central display.

9. The HMD device of claim 5, wherein the controller is configured to determine a size of the first duplicated portion of the image scene based on a peripheral lens-display distance between the peripheral lens and the peripheral display.

10. The HMD device of claim 4, wherein the controller is configured to:
based on identification of the straight gaze of the pupil, generate the second image by applying a first trapezoidal pre-distortion to a portion of the image scene to be displayed by the peripheral display; and
based on identification of a non-straight gaze of the pupil, generate the second image by applying a second trapezoidal pre-distortion to the portion of the image scene to be displayed by the peripheral display, wherein the second trapezoidal pre-distortion is different from the first trapezoidal pre-distortion.

11. The HMD device of claim 4, wherein the controller is configured to determine a pre-distortion based on at least one of an eye-relief setting of the HMD device, a tilt angle of the HMD device, or an interpupillary distance (IPD) of the user, and to apply the pre-distortion to at least one portion of the image scene, the at least one portion of the image scene comprising at least one of an image portion to be displayed by the central display, or an image portion to be displayed by the peripheral display.

12. The HMD device of claim 4, wherein the controller is configured to, based on one or more spectral attributes of at least one of the central lens or the peripheral lens, calibrate at least one of a color gamut of the first image relative to a color gamut of the second image or a spatial light intensity of the first image relative to a spatial light intensity of the second image.

13. The HMD device of claim 4, wherein the controller is configured to identify a tilt setting of the tilt angle of the peripheral lens relative to the central lens, and to determine a portion of the image scene to be displayed by the peripheral display based on the tilt setting.

14. The HMD device of claim 4, wherein the controller is configured to monitor a gaze angle of the pupil, and to control an adjustment of the tilt angle of the peripheral lens relative to the central lens based on the gaze angle of the pupil.

15. The HMD device of claim 4, wherein the controller is configured to:
process image information of a cornea over the pupil to identify a corneal reflection image comprising a combination of the first image from the central display and the second image from the peripheral display; and
based on the corneal reflection image, adjust at least one of the first image displayed by the central display or the second image displayed by the peripheral display.

16. The HMD device of claim 1 comprising a tilt angle adjuster configured to adjust the tilt angle of the peripheral lens relative to the central lens.

17. The HMD device of claim 1, wherein the central lens is separated from the peripheral lens by a distance of at least 1 millimeter (mm).

18. The HMD device of claim 1, wherein an edge of the central lens is in direct contact with an edge of the peripheral lens.

19. The HMD device of claim 1, wherein the peripheral display comprises an other xtz display area to display an other xtz portion of the second image, the other xtz display area adjacent to an other end of the tz display area, the other xtz display area configured as another extension to the tz display area in the direction away from the nose of the user, wherein the peripheral lens comprises an other xtz lens portion configured to direct light of the other xtz portion of the second image toward the pupil at the temporal gaze of the pupil.

20. The HMD device of claim 1, wherein a first part of the cz lens portion is configured to direct light beams from a first part of the cz display area to a center of eye rotation corresponding to the pupil, wherein a second part of the cz lens portion is configured to direct light beams from a second part of the cz display area to a point defined based on a position of the pupil at the straight gaze angle, wherein the xcz lens portion is configured to direct light beams from the xcz display area to a point defined based on a position of the pupil at the nasal gaze angle, and wherein the first part of the cz lens portion is between the xcz lens portion and the second part of the cz lens portion.

21. The HMD device of claim 1, wherein the tz lens portion is configured to direct light beams from the tz display area to a point defined based on a position of the pupil at the straight gaze angle, and wherein the xtz lens portion is configured to direct light beams from the xtz display area to a center of eye rotation corresponding to the pupil.

22. The HMD device of claim 1, wherein a top part and a bottom part of the central lens are configured to direct light beams from the cz display area to a point defined based on a position of the pupil at the straight gaze angle, and wherein a middle part of the central lens, which is between the top part and the bottom part of the central lens, is configured to direct light beams from the cz display area to a center of eye rotation corresponding to the pupil.

23. The HMD device of claim 1, wherein each of the central FoV and the temporal FoV comprises a horizontal FoV of at least 45 degrees.

24. The HMD device of claim 1, wherein the central FoV and the temporal FoV are configured to form a continuous horizontal FoV of at least 130 degrees.

25. The HMD device of claim 1, wherein at least one lens of the central lens or the peripheral lens comprises a hybrid convex-concave lens, the hybrid convex-concave lens is convex in a display direction and concave in an eye direction, the hybrid convex-concave lens comprising a central freeform aspherical lens portion, and a peripheral freeform Fresnel lens portion.

26. The HMD device of claim 1 comprising:
a first HMD to display a first image scene to a first pupil of the user, the first HMD comprising the central display, the central lens, the peripheral display, and the peripheral lens; and
a second HMD to display a second image scene to a second pupil of the user, the second HMD comprising an other central display, an other central lens, an other peripheral display, and an other peripheral lens.

* * * * *